(12) United States Patent
Stogdill

(10) Patent No.: US 12,060,954 B2
(45) Date of Patent: *Aug. 13, 2024

(54) PIPING COMPONENT AND SEALING ELEMENT FOR INSERTION THEREIN

(71) Applicant: NIBCO Inc., Elkhart, IN (US)

(72) Inventor: James Stogdill, Elkhart, IN (US)

(73) Assignee: NIBCO Inc., Elkhart, IN (US)

( * ) Notice: Subject to any disclaimer, the term of this patent is extended or adjusted under 35 U.S.C. 154(b) by 301 days.

This patent is subject to a terminal disclaimer.

(21) Appl. No.: 17/245,692

(22) Filed: Apr. 30, 2021

(65) Prior Publication Data

US 2021/0247003 A1  Aug. 12, 2021

Related U.S. Application Data

(63) Continuation-in-part of application No. 16/815,638, filed on Mar. 11, 2020.

(Continued)

(51) Int. Cl.
*F16L 13/013* (2006.01)
*F16L 13/12* (2006.01)
(Continued)

(52) U.S. Cl.
CPC .......... *F16L 13/013* (2013.01); *F16L 13/122* (2013.01); *F16L 13/141* (2013.01); *F16L 13/142* (2013.01); *F16L 21/03* (2013.01)

(58) Field of Classification Search
CPC ....... F16L 13/141; F16L 13/142; F16L 13/14; F16L 13/147; F16L 2013/145;
(Continued)

(56) References Cited

U.S. PATENT DOCUMENTS 3,539,205 A  11/1970  Johnson, Jr.
3,572,779 A   3/1971  Dawson
(Continued)

FOREIGN PATENT DOCUMENTS

CA  2368526 A1  8/2001
DE  29521672 U1  2/1998
(Continued)

OTHER PUBLICATIONS

Copper Tubes. [online]. Dimensions and Physical Characteristics of Copper Tube. Retrieved from the Internet: <URL:https://web.archive.org/web/20160709073200/http://www.copper.org/applications/plumbing/cth/standard-tubes/cth_1stand_prop.html#> (Year: 2016).*
(Continued)

*Primary Examiner* — William S. Choi
(74) *Attorney, Agent, or Firm* — PRICE HENEVELD LLP

(57) ABSTRACT

An assembly configured to be press joined with a pipe by a pressing tool includes a piping component, which includes a body, a first end having a rim and an inner surface having a plurality of grooves, and a sealing recess wall positioned between the first end and the body and defining a sealing recess. The assembly also includes a sealing element received within the sealing recess of the piping component and having a sealing element thickness. The sealing element thickness of the sealing element is about equal to and not less than a Minimum Sealing Element Thickness Value of the sealing element.

7 Claims, 13 Drawing Sheets

Related U.S. Application Data

(60) Provisional application No. 62/823,772, filed on Mar. 26, 2019.

(51) Int. Cl.
*F16L 13/14* (2006.01)
*F16L 21/03* (2006.01)

(58) Field of Classification Search
CPC ......... F16L 13/166; F16L 21/02; F16L 21/03; B25B 7/02; B25B 27/10
See application file for complete search history.

(56) References Cited

U.S. PATENT DOCUMENTS

| | | |
|---|---|---|
| 3,579,794 A | 5/1971 | Powell |
| 3,675,949 A | 7/1972 | Dawson |
| 4,368,894 A | 1/1983 | Parmann |
| 5,080,406 A | 1/1992 | Hyatt et al. |
| 5,205,594 A | 4/1993 | Stoll et al. |
| 5,484,174 A * | 1/1996 | Gotoh ................. F16L 13/142 |
| 5,496,073 A | 3/1996 | Grenier |
| 5,603,530 A | 2/1997 | Guest |
| 6,260,891 B1 | 7/2001 | Foering et al. |
| 6,488,319 B2 | 12/2002 | Jones |
| 6,581,983 B1 | 6/2003 | Viegener |
| 6,692,040 B1 | 2/2004 | McKay et al. |
| 6,719,299 B2 | 4/2004 | Muhle |
| 6,726,256 B2 | 4/2004 | Viegener |
| 6,874,823 B2 | 4/2005 | Viegener |
| 7,475,918 B2 | 1/2009 | Kaimer et al. |
| 7,823,932 B2 | 11/2010 | Webb et al. |
| 8,925,978 B2 | 1/2015 | Jamison et al. |
| 9,145,992 B2 | 9/2015 | Arment et al. |
| 9,188,260 B2 | 11/2015 | Spence |
| 9,638,361 B2 | 5/2017 | Arment et al. |
| 2006/0175829 A1 | 8/2006 | Kaimer et al. |
| 2007/0090641 A1* | 4/2007 | Jamison ................. F16L 21/03 |
| 2007/0246938 A1 | 10/2007 | Webb et al. |
| 2009/0173130 A1* | 7/2009 | Duggan ................. F16L 13/142 |
| 2010/0253066 A1* | 10/2010 | Cygler, III ............. F16L 13/142 |
| 2012/0161438 A1* | 6/2012 | Rischen ................ F16L 13/142 |
| 2017/0328498 A1 | 11/2017 | Salehi-Bakhtiari |

FOREIGN PATENT DOCUMENTS

| | | |
|---|---|---|
| DE | 19842186 A1 | 3/2000 |
| DE | 102005015278 A1 | 10/2006 |
| DE | 602004002083 T2 | 4/2007 |
| DE | 102005062738 A1 | 7/2007 |
| DE | 102006008317 A1 | 8/2007 |
| DE | 102006027151 A1 | 12/2007 |
| EP | 1128115 A2 | 8/2001 |
| EP | 1201982 A2 | 5/2002 |
| EP | 1249655 A1 | 10/2002 |
| EP | 1361386 A1 | 11/2003 |
| EP | 1424523 A1 | 6/2004 |
| EP | 1486713 A1 | 12/2004 |
| EP | 1555473 B1 | 8/2006 |
| EP | 1837574 A1 | 9/2007 |
| EP | 1775507 B1 | 3/2008 |
| ES | 2162781 T3 | 1/2002 |
| JP | 2004108447 A | 4/2004 |
| JP | 2004108448 A | 4/2004 |

OTHER PUBLICATIONS

Marco Rubber & Plastics. [online]. Common Metric O-rings Sizes. Retrieved from the Internet: <URL:https://web.archive.org/web/20170706024448/http://www.marcorubber.com/o-ring-size-chart-metric.htm> (Year: 2017).*

NIBCO PressACR System catalog, C-NPSACR-0520, revision dates of Jan. 14 and 24, 2020, and May 4, 13, and 14, 2020 (uploaded to www.nibco.com on May 15, 2020 at 8:43 am ET), 21 pages.

NIBCO Customer Announcement, "NIBCO Launches PressACR Product Line for HVACR Applications" (uploaded to www.nibco.com on May 15, 2020 at 8:56 am ET), 4 pages.

Coupling Assembly 1 1/8" drawing, NIBCO Model No. PC9600-DS, rev. 02, 1 page (created on Jan. 5, 2021).

ACR Crimp Seal 1 1/8" drawing, NIBCO Material No. T048087 PP, rev. 00, 1 page (created on Jan. 5, 2021).

Coupling 1 1/8" drawing, NIBCO Material No. 900145RPC WP, rev. 00, 1 page (created on Jan. 5, 2021).

Press jaw 1 1/8", Klauke Part No. KSP4RD (NIBCO Model No. PCR-3M), Rev. A, 5 pages (created Jan. 21, 2020).

* cited by examiner

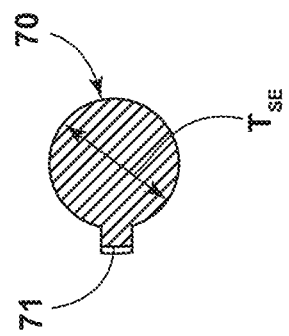
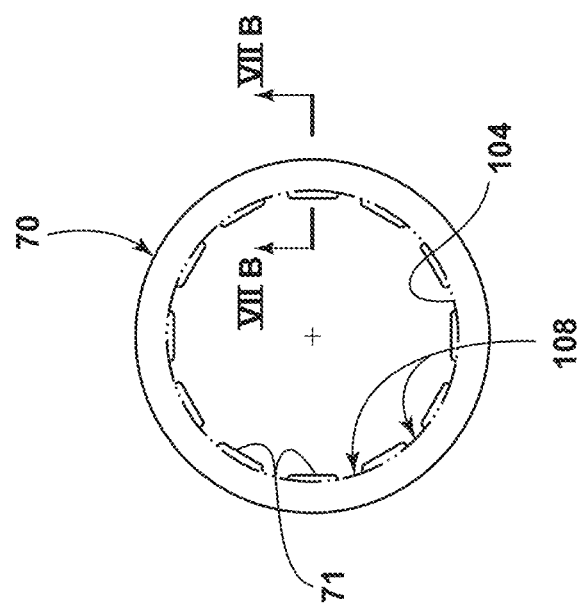
FIG. 7B
FIG. 7A

PIPING COMPONENT AND SEALING ELEMENT FOR INSERTION THEREIN

CROSS-REFERENCE TO RELATED APPLICATIONS

This patent application is a continuation-in-part that claims priority to and the benefit under 35 U.S.C. § 120 of U.S. patent application Ser. No. 16/815,638, filed on Mar. 11, 2020, which claims priority under 35 U.S.C. § 119(e) to U.S. Provisional Patent Application No. 62/823,772, entitled "PIPING COMPONENT HAVING A PLURALITY OF GROOVES," filed Mar. 26, 2019, the disclosures of each of which are incorporated herein by reference in their entirety.

FIELD

The present disclosure generally relates to a piping component, a sealing element for insertion into the piping component, and a pressing tool for pressing the piping component with a pipe.

BACKGROUND

Over the years, the plumbing industry has witnessed a remarkable increase in the use of mechanical joinery systems as alternatives to traditional threaded connections (e.g., as-manufactured fittings with threaded ends joined by threading) and thermal connections (e.g., connections made by brazing, soldering, and/or welding). Further, within the general family of mechanical joinery, 'press' joint connections, as understood by those in the field of this disclosure, are finding use in or are being considered for application.

'Press' mechanical joinery includes interlocking devices such as sleeves that aid in affixing mating tubular members. Pressing tools having jaws are commonly used to press join the interlocking devices with the inserted tubular members. Suboptimal jaw designs often inhibit the effectiveness of press joint connection. Accordingly, a pressing tool with improved jaw geometries may be desired. Further, improved sealing elements for insertion into piping components may be desired.

SUMMARY OF THE DISCLOSURE

According to an aspect of the present disclosure, an assembly configured to be press joined with a pipe by a pressing tool includes a piping component, which includes a body, a first end having a rim and an inner surface having a plurality of grooves, and a sealing recess wall positioned between the first end and the body and defining a sealing recess. The assembly also includes a sealing element received within the sealing recess of the piping component and having a sealing element thickness. The sealing element thickness of the sealing element is about equal to and not less than a Minimum Sealing Element Thickness Value of the sealing element.

According to another aspect of the present disclosure, an assembly configured to be press joined with a pipe by a pressing tool includes a piping component, which includes a body, a first end having a rim, and a sealing recess wall positioned between the first end and the body and defining a sealing recess. The assembly also includes a sealing element received within the sealing recess of the piping component. A sealing element thickness of the sealing element is about equal to and not less than a Minimum Sealing Element Thickness Value of the sealing element.

The pressing tool includes first and second pressing jaws each having a proximal end and a distal end and being operable between an open condition and a closed condition. In the open condition, the distal ends are separated from each other. In the closed condition, the distal ends are in contact with each other. The first pressing jaw includes a first pressing geometry that forms a first end-crimping portion configured to crimp a first end of the piping component, a second pressing geometry that forms a sealing recess-pressing portion configured to receive and press a sealing recess wall of the piping component, and a third pressing geometry that forms a body-crimping portion configured to crimp a body of the piping component. The first pressing geometry is spaced apart axially from the second pressing geometry and extends axially from an inner periphery that is a first distance from the second pressing geometry to an outer periphery that is a second distance from the second pressing geometry. The second distance is greater than the first distance. Further, the third pressing geometry is spaced apart axially from the first pressing geometry, such that the second pressing geometry is positioned axially between the first and third pressing geometries, and the third pressing geometry extends axially from an inner periphery that is a third distance from the second pressing geometry to an outer periphery that is a fourth distance from the second pressing geometry. The fourth distance is greater than the third distance. If the sealing recess wall is received within the sealing recess-pressing portion and a crimp width of the pressing tool is about equal to and not greater than a Maximum Crimp Width Value of the pressing tool, the outer periphery of the first pressing geometry is positioned axially between the rim of the first end and the sealing recess wall.

According to a further aspect of the present disclosure, a method of press joining a piping component with a pipe via a pressing tool includes the step of inserting the pipe into the piping component. The piping component has a sealing element received within a sealing recess defined by a sealing recess wall of the piping component. The sealing element has a sealing element thickness and the sealing element thickness of the sealing element is about equal to and not less than a Minimum Sealing Element Thickness Value of the sealing element. The method further includes the step of pressing the pipe and piping component with the pressing tool, such that a sealing recess-pressing portion of the pressing tool presses the sealing recess wall of the piping component and a first end-crimping portion of the pressing tool crimps a first end of the piping component between the sealing recess wall and a rim of the first end positioned distally from the sealing recess wall, and such that the pipe is operable to withstand 2 million vibration cycles at an amplitude of 0.125 inches and a frequency of 16.67 Hertz under a UL 109 vibration test without breakage along the rim of the first end.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 7A is a plan view of a sealing element, according to various examples;

FIG. 7B is a cross-sectional view of the sealing element of FIG. 7A taken through line VIIB-VIIB;

DETAILED DESCRIPTION

Figure 1:
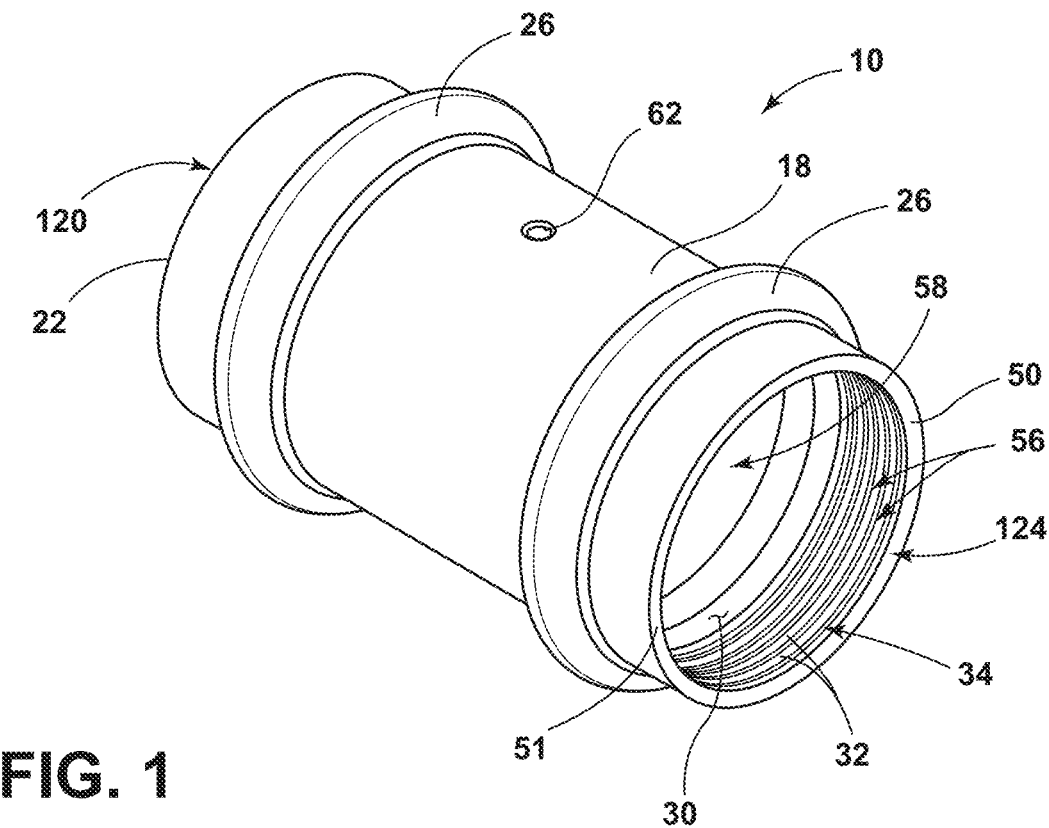
FIG. 1 is a side perspective view of a piping component, according to various examples.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

As used herein, the term "about" means that amounts, sizes, formulations, parameters, and other quantities and characteristics are not and need not be exact, but may be approximate and/or larger or smaller, as desired, unless stated otherwise, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

For purposes of this disclosure, the term "axial" (in all of its forms: axial, axially, etc.) generally refers to one or more directions that are parallel to an axis about which at least one of a first pressing jaw and a second pressing jaw of the pressing tool described herein pivots between the open and closed conditions. Accordingly, "the first pressing geometry extends axially from an inner periphery to an outer periphery" should be understood to mean that the first pressing geometry extends in a direction that is parallel to an axis about which at least one of the first and second pressing jaws pivots between the open and closed conditions.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The following disclosure generally describes a pressing tool for press joining a piping component with a pipe. The pressing tool includes first and second pressing jaws. The first and second pressing jaws each include a proximal end and a distal and are operable between an open condition, wherein the distal ends are separated from each other, and a closed condition, wherein the distal ends are in contact with each other. The first pressing jaw includes a first pressing geometry that forms a first end-crimping portion configured to crimp a first end of the piping component. The first end-crimping portion extends generally semi-circumferentially from the distal end of the first pressing jaw to the proximal end of the first pressing jaw. The first end-crimping portion includes a first section positioned between the proximal and distal ends of the first pressing jaw. The first section has a curvature of a first radius. The first end-crimping portion further includes a second section positioned between the first section and the distal end of the first pressing jaw. The second section has a curvature of a second radius that is less than the first radius. The second section is recessed relative to a third section of the first end-crimping portion that is adjacent to the second section and between the distal end of the first pressing jaw and the second section.

In the disclosure, and depicted in exemplary form in FIGS. 1-6B, a piping component 10 for a press fitting 14 may include a body 18 including a body inner diameter D1. A first end 22 may include an end inner diameter D2 and an inner surface 30. A sealing recess 26 may be positioned between the first end 22 and the body 18. The inner surface 30 may include a plurality of grooves 34. The plurality of grooves 34 may be integrally formed with the first end 22 and may include a blunt surface 36 configured for a press fit between a pipe 100 and the piping component 10. The plurality of grooves 34 may include a groove inner diameter D3 that is substantially the same as or within no more than about ±5% of the body inner diameter D1 and the end inner diameter D2.

Figure 2:
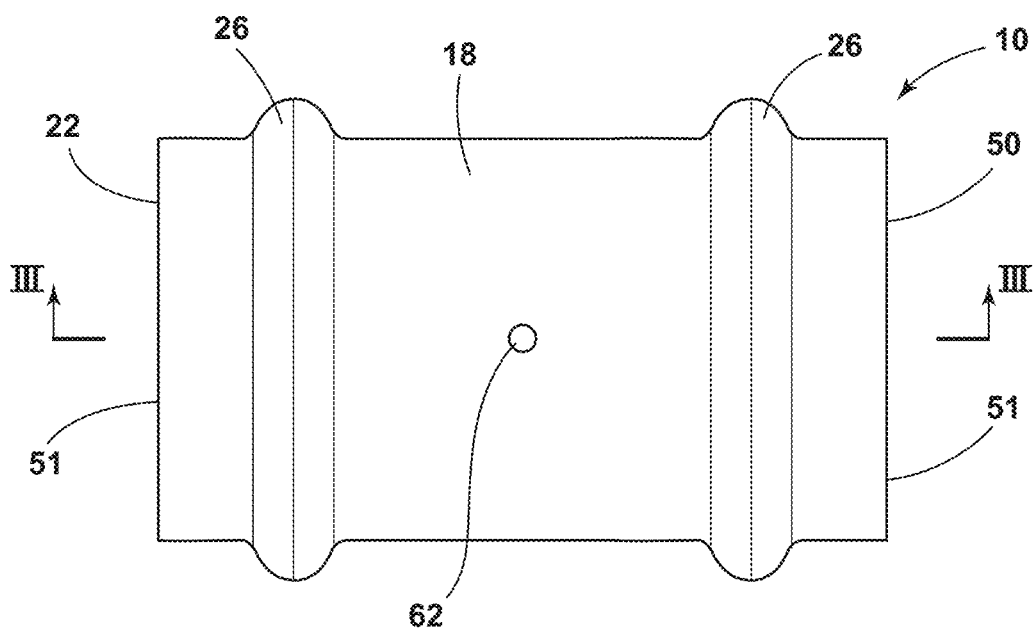
FIG. 2 is a side profile view of the piping component of FIG. 1.
Figure 3:
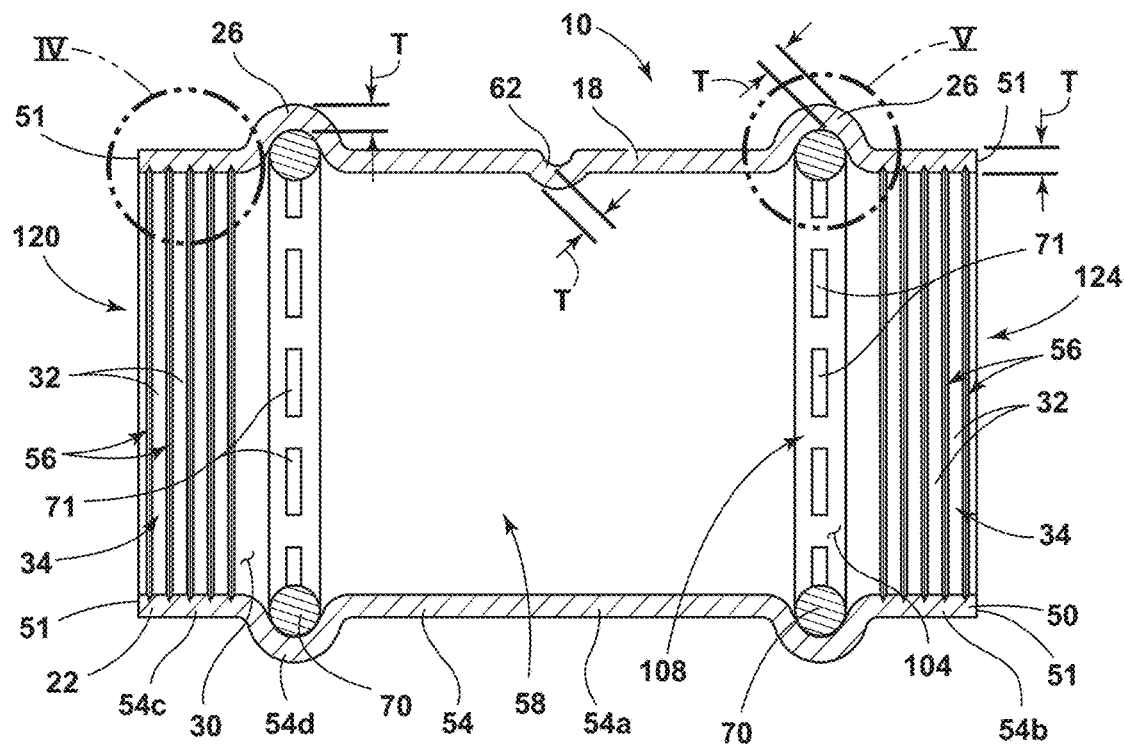
FIG. 3 is a cross-sectional view at line III-Ill of the piping component of FIG. 2.

Referring to FIGS. 1-3, the piping component 10 is shown according to various examples. The piping component 10 includes the body 18 integrally formed with the open first end 22 and an open second end 50. The piping component 10 may further include a wall 54. The wall 54 may extend from the first end 22 to the second end 50 (e.g., open ends of the piping component 10), encompassing the body 18 and defining a body cavity 58 of the piping component 10. The wall 54 of the piping component 10 may include the inner surface 30 and may be shaped to form the sealing recess 26 of the piping component 10. In some examples, the wall 54 may include a body wall 54a, a first end wall 54b, a second end wall 54c, and a sealing recess wall 54d. As illustrated in FIGS. 1-3, the first and second ends 22, 50 both include rims 51 positioned distally from the sealing recess walls 54d adjacent to the first and second ends 22, 50. The rim 51 of the first end 22 extends from the inner surface 30 of the first end 22 to an outer surface of the first end 22 opposite the inner surface 30 of the first end 22. In various embodiments, the first end 22 of the piping component 10 extends from the sealing recess wall 54d to the rim 51 of the first end 22.

The wall 54 of the piping component 10 may further include a stop 62 positioned between the first end 22 and the second end 50 of the piping component 10. The stop 62 may extend into the body cavity 58 of the piping component 10. The stop 62 may be equally spaced from each of the first and second ends 22, 50 of the piping component 10. Alternatively, the stop 62 may be positioned at any point along the body 18. In various examples, the stop 62 may be generally hemispherical. In other examples, the stop 62 may extend circumferentially about the body 18 of the piping component 10 and may have a circular, triangular, square, or rectangular cross-section. Where the cross-section includes corners, the corners may be rounded. In still other examples, more than one stop 62 may be used (e.g., a pair of stops 62 extending from opposing sides of the body 18 of the piping component 10, or a plurality of stops 62 circumferentially spaced apart about the body 18).

Referring again to FIGS. 1-3, the piping component 10 may further include at least one sealing recess 26 positioned between the body 18 and one of the first end 22 and the second end 50 of the piping component 10. The sealing recess 26 may be defined by the wall 54, and/or the sealing recess wall 54d, of the piping component 10. In various examples, the piping component 10 may include a sealing recess 26 positioned proximate the first end 22 of the piping component 10 and a sealing recess 26 positioned proximate the second end 50 of the piping component 10. In other examples, the piping component 10 may include more than one sealing recess 26 positioned proximate the first end 22 of the piping component 10 and more than one sealing recess 26 positioned proximate the second end 50 of the piping component 10. Each sealing recess 26 may be configured to receive a sealing element 70.

As shown in FIG. 3, the wall 54 may include a substantially uniform thickness T from the first end 22 of the piping component 10 to the second end 50 of the piping component 10. The thickness T of the wall 54 may be consistent across the sealing recesses 26, as well as along the body 18 of the piping component 10. The thickness T may be about 0.03 inches to about 0.07 inches, about 0.04 inches to about 0.06 inches, or any value or range of values therebetween. For example, the thickness T may be about 0.04 inches. In other examples, the thickness T may be about 0.06 inches. The thickness T may also be consistent across the stop 62. Where the thickness T is consistent across the stop 62, the radius and/or sizing of the stop 62 may be at least partially determined by the thickness T.

Figure 4:
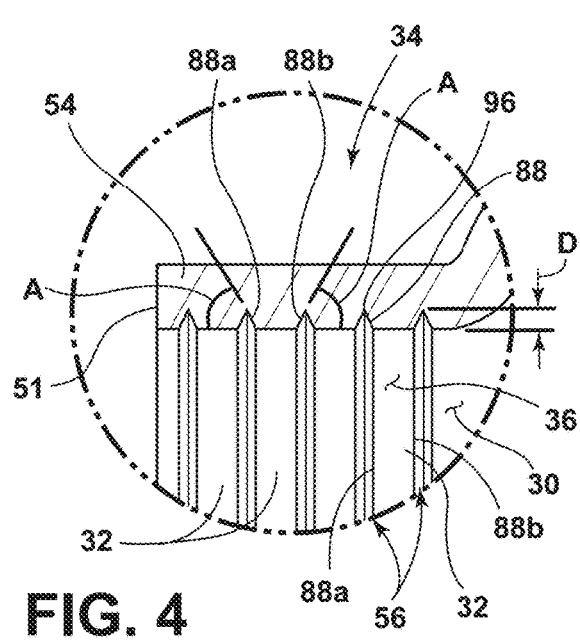
FIG. 4 is an expanded view of a plurality of grooves at least partially defined by a plurality of ridges of the piping component of FIG. 3.

Referring now to FIGS. 3 and 4, the inner surface 30 of the wall 54 of the piping component 10 may include the plurality of grooves 34. The plurality of grooves 34 may include grooves 56 extending circumferentially about the inner surface 30 of the piping component 10 proximate one or both of the first and second ends 22, 50. The plurality of grooves 34 may be positioned between one of the sealing recesses 26 and one of the first end 22 and the second end 50. The grooves 56 of the plurality of grooves 34 may be evenly spaced apart between the sealing recess 26 and the rim 51 of the first or second end 22, 50. In various examples, only five grooves 56 of the plurality of grooves 34 may be formed proximate each of the first and second ends 22, 50 (see FIG. 3). In other examples, the plurality of grooves 34 may include any number of grooves 56 positioned between the sealing recess 26 and the rim 51 of the first or second end 22, 50.

As introduced above, the plurality of grooves 34 may include one or more ridges 32. Each ridge 32 may at least partially define one or more of the grooves 56 of the plurality of grooves 34. The grooves 56 may alternate with the ridges 32 across the inner surface 30 of piping component 10 between the respective sealing recess 26 and rim 51 of the first or second end 22, 50. Each of the ridges 32 may be substantially similar in size and may be evenly spaced from any other ridges 32 so that each groove 56 has substantially the same cross-sectional area. The number of ridges 32 may be the same or less than the number of grooves 56 (e.g., four ridges 32 at least partially define five grooves 56, as shown in FIGS. 3 and 4).

As shown in FIG. 4, each ridge 32 includes the blunt surface 36 oriented to be parallel and/or coplanar with the inner surface 30 of the wall 54 of the piping component 10.

Each ridge 32 further includes at least one angled edge 88 extending downward from an edge of the blunt surface 36. In some examples, each ridge 32 may include first and second angled edges 88a, 88b. The first and second angled edges 88a, 88b may have opposite slopes to create a trapezoidal cross-section for the ridge 32. Each of the first and second angled edges 88a, 88b may be oriented to form an angle A relative to the inner surface 30. The angle A may be about 40 degrees to about 80 degrees, about 50 degrees to about 70 degrees, about 55 degrees to about 65 degrees, or any value or range of values therebetween. For example, the angle A may be about 60 degrees relative to the inner surface 30.

The angled edges 88a, 88b may be positioned to meet at a furthest recessed point 96 defining a centerline of the respective groove 56. A depth D of each groove 56 from the inner surface 30 to the point 96 may be about 0.005 inches to about 0.020 inches, about 0.007 inches to about 0.010 inches, or any value or range of values therebetween. For example, the depth D may be about 0.005 inches, about 0.006 inches, about 0.007 inches, about 0.008 inches, about 0.009 inches, about 0.010 inches, about 0.011 inches, about 0.012 inches, or any value or range of values between these depth values.

Figure 5:
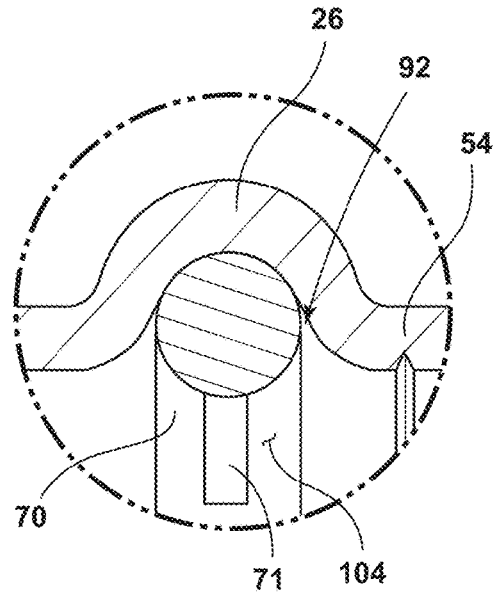
FIG. 5 is an expanded view of a sealing recess of the piping component of FIG. 3.

Referring now to FIGS. 3 and 5, as discussed previously, each sealing recess 26 may be configured to receive a sealing element 70. The sealing recess 26 may extend circumferentially about the piping component 10 and may separate the body 18 of the piping component 10 from the open first and second ends 22, 50. The sealing recess 26 may define a space 92 configured to receive the sealing element 70. The sealing element 70 may be any sealing element 70 configured to form an interference fit with a pipe 100 (see FIG. 6). Each sealing element 70 may further include an inner surface 104 defining a plurality of notches 108. In some implementations, the plurality of notches 108 may be configured to be used for a leak test. In some examples, the inner surface 104 may be a smooth surface without notches.

Figure 6:
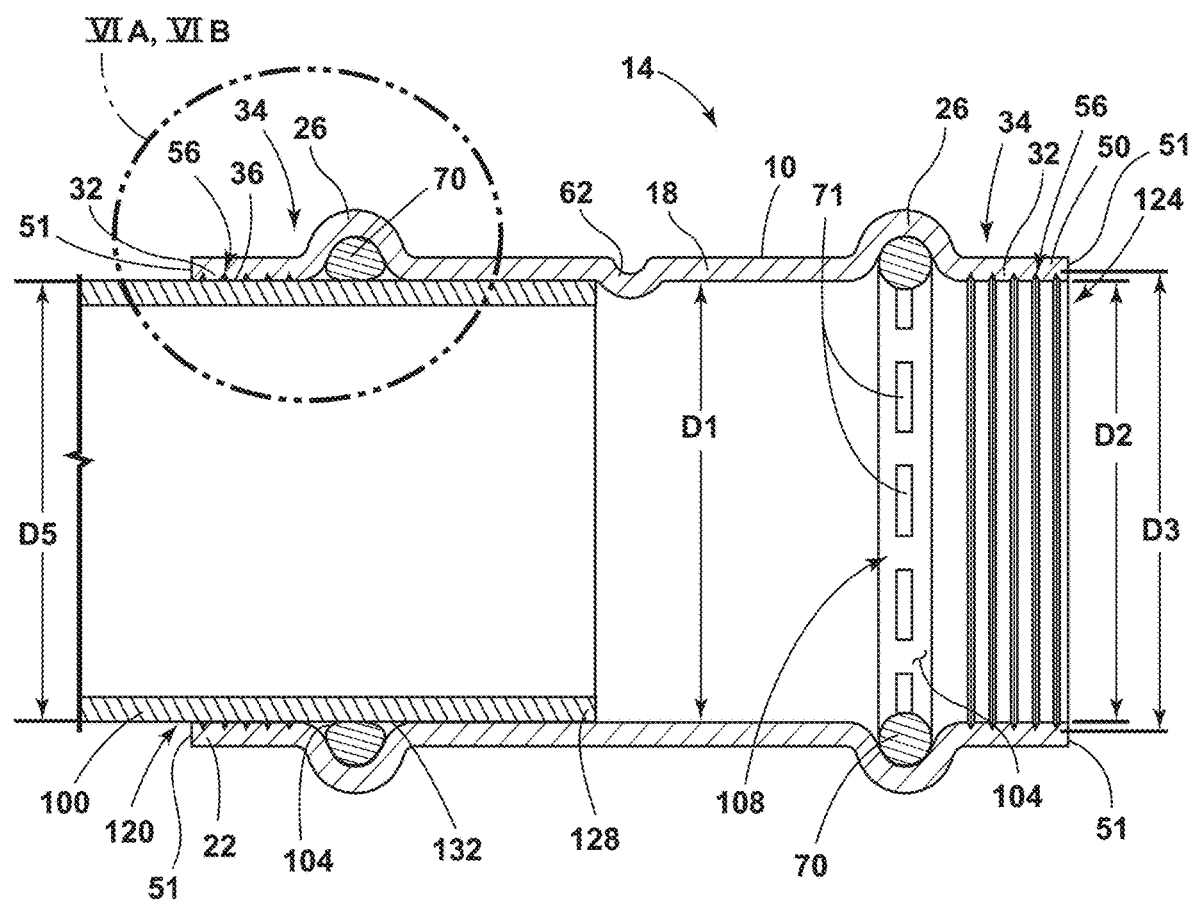
FIG. 6 is a cross-sectional view of a press fitting assembly including the piping component of FIG. 3.

Referring now to FIG. 6, the piping component 10 may include the body 18 having the body inner diameter D1. A first opening 120 may be defined by the open first end 22, and a second opening 124 may be defined by the open second end 50. Each of the first and second openings 120, 124 may have an end inner diameter D2. In various examples, the body inner diameter D1 may be the same as the end inner diameter D2. In other examples, the body inner diameter D1 may be larger than the end inner diameter D2. In still other examples, the body inner diameter D1 may be smaller than the end inner diameter D2. The end inner diameter D2 may be the same for both the first end 22 and the second end 50. Alternatively, the end inner diameter D2 of the first and second ends 22, 50 may vary.

The grooves 56 of the plurality of grooves 34 may be in communication with the openings 120, 124 of the first or second end 22, 50. The depth D of the grooves 56 may provide a groove inner diameter D3 of the piping component 10. The groove inner diameter D3 may be within plus or minus a percentage of the body inner diameter D1 and/or the end inner diameter D2. The percentage may be about 0% or within a range of about 1% to about 6%, about 2% to about 5%, about 3% to about 4%, or any value or range of values therebetween. For example, the groove inner diameter D3 may be within about 5% of the body inner diameter D1 and/or the end inner diameter D2. In another example, the groove inner diameter D3 may be substantially the same as or no more than about 4% greater than the body inner diameter D1 and/or the end inner diameter D2. In still other examples, the groove inner diameter D3 may be no more than 1% greater than the body inner diameter D1 and/or the end inner diameter D2.

Still referring to FIG. 6, the openings 120, 124 of the piping component 10 may be sized to receive the pipe 100 within the respective open first or second end 22, 50. The pipe 100 may be positioned within the piping component 10, such that a first end 128 of the pipe 100 abuts the stop 62. The inner surface 104 of the sealing element 70 may form an interference fit with an outer surface 132 of the pipe 100. The blunt surface 36 of each ridge 32 of the plurality of grooves 34 may also be configured to form an interference fit with the outer surface 132 of the pipe 100. To form these interference fits, the pipe 100 may have a pipe outer diameter D5 that is less than the end inner diameter D2 of the piping component 10. This difference in size between the pipe outer diameter D5 and the end inner diameter D2 allows the pipe 100 to be received by the respective first and second ends 22, 50.

Figure 6A:
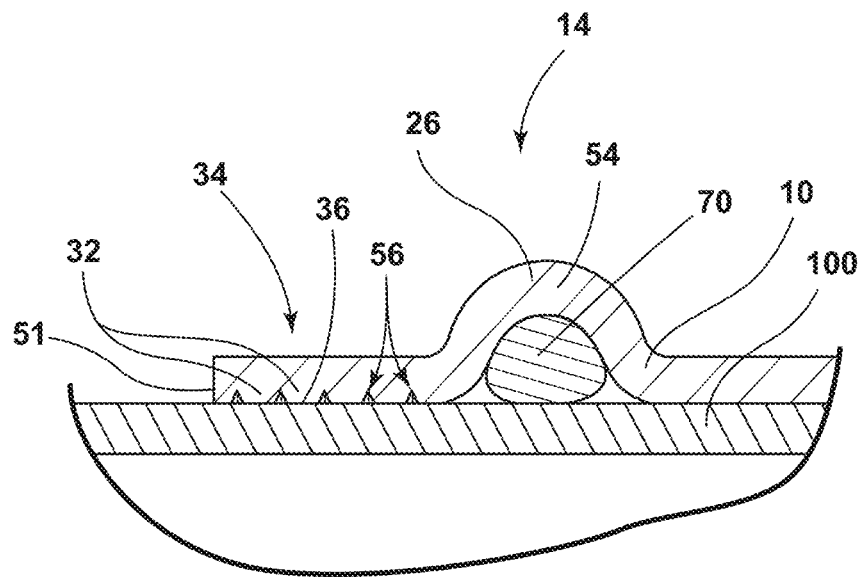
FIG. 6A is an expanded view of a plurality of grooves of the piping component of FIG. 6 with a pipe in a first state, according to various examples.
Figure 6B:
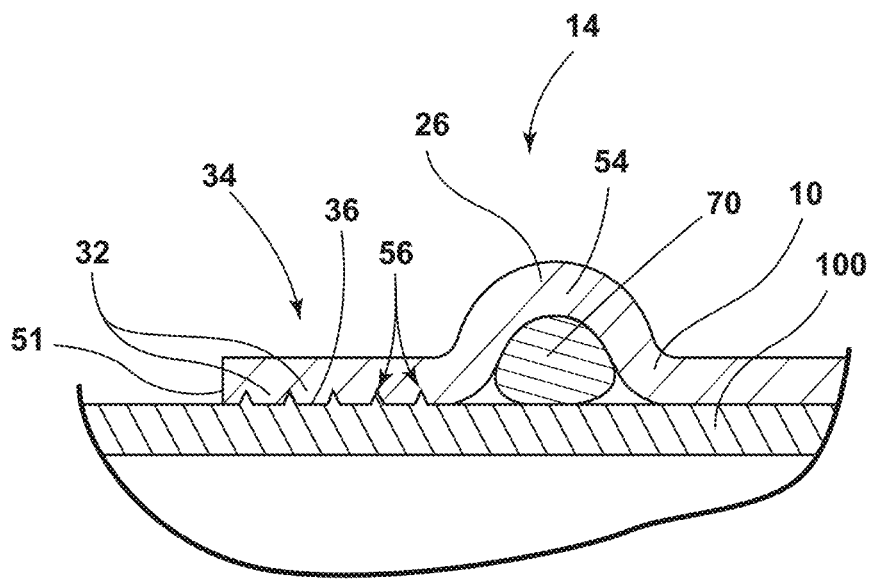
FIG. 6B is an expanded view of a plurality of grooves of the piping component of FIG. 6 with a pipe in a second state, according to various examples.

Referring now to FIGS. 6-6B, the piping component 10 and the pipe 100 may be formed of a copper alloy. In other examples, the piping component 10 may be formed of a first copper alloy, and the pipe 100 may be formed of a second copper alloy. In still other examples, the piping component 10 may be formed of an alloy material, and the pipe 100 may be formed of a copper alloy. Copper alloys, like those used to form the pipe 100, will expand when exposed to high pressure, pushing the outer surface 132 of the pipe 100 against the plurality of grooves 34 (see FIG. 6B). The positioning of the plurality of grooves 34 such that the grooves 56 and the ridges 32 are proximate the outer surface 132 of the pipe 100 provides expansion space for the pipe 100 when high pressure is applied. It will be understood that the expansion of the material may occur in any combination of a piping component 10 and a pipe 100 where the piping component 10 is formed of a material having a higher hardness, or resistance to deformation, than another material that the pipe 100 is formed of.

The plurality of grooves 34 are positioned proximate the outer surface 132 of the pipe 100 so that, when the piping component 10 is pressed during press joining of the piping component 10 and the pipe 100, the blunt surfaces 36 of the ridges 32 of the plurality of grooves 34 abut the outer surface 132 of the pipe 100 (see FIG. 6A). When the pipe 100 is used with a high-pressure medium, the pipe 100 expands into the groove 56 of the plurality of grooves 56 (see FIG. 6B), creating an additional grip and interference fit between the piping component 10 and the pipe 100. This additional interference fit provides a secure coupling of the piping component 10 with the pipe 100 that is stronger than the coupling formed when no grooves 34 are present. The grooves 56 of the plurality of grooves 34 provide a space for receiving the expansion of the pipe 100, preventing the expansion from negatively affecting the grip of the piping component 10 on the pipe 100. Similarly, the blunt surfaces 36 of the ridges 32 of the plurality of grooves 34 provide a grip on the outer surface 132 of the pipe 100.

According to embodiments, the grooves 56 of the plurality of grooves 34 can be selected with a depth D, such that resistance to pressure across the pipe 100 may be improved when the pipe 100 is exposed to the high-pressure medium. In some examples, the depth D of the grooves 56 may be configured to withstand a burst pressure of at least about 1,700 pounds per square inch (PSI). In some examples, the grooves 56 may be configured to withstand a burst pressure of at least about 1,700 PSI, at least about 1,800 PSI, at least about 1,900 PSI, at least about 2,000 PSI, at least about 2,100 PSI, at least about 2,200 PSI, at least about 2,300 PSI, at least about 2,400 PSI, or any value or range of values within these ranges. As an example, the joint between the piping component 10 and the pipe 100 may withstand about 1,750 PSI to about 1,950 PSI without the pressed joint bursting. As another example, the grip between the piping component 10 and the pipe 100 may withstand about 2,400 PSI to about 2,500 PSI. As yet another example, the grip between the piping component 10 and the pipe 100 may withstand about 2,200 PSI to about 2,500 PSI. When the pressure at the pressed joint reaches above about 2,400 PSI to about 2,500 PSI, the pipe 100 may experience failure not attributable to the grip of the piping component 10 on the pipe 100.

Referring now to FIGS. 1-6B, in various examples, prior to formation of a press fit between the piping component 10 and the pipe 100, a leak test may be performed using the sealing element 70. The plurality of notches 108 of the sealing element 70 may be configured to cause a leak upon leak testing of the piping component 10 when the piping component 10 is engaged with the pipe 100. In other words, the inner surface 104 of the sealing element 70 includes the plurality of notches 108 configured to cause a leak upon leak testing of the piping component 10 upon insertion of the pipe 100 and prior to a formation of a press fit between the piping component 10 and the pipe 100. When the piping component 10 is press fit with the pipe 100, the sealing element 70 may be compressed to eliminate the plurality of notches 108 and form an interference fit with the outer surface 132 of the pipe 100, as discussed previously.

Referring to FIGS. 3, 6, 7A, and 7B, in other examples, the plurality of notches 108 may be defined by one or more protrusions 71 extending from the inner surface 104 of the sealing element 70. The sealing element 70 may be configured to rotate within the sealing recess 26. The rotation may encompass about 10 degrees to about 90 degrees, about 20 degrees to about 80 degrees, about 30 degrees to about 70 degrees, about 40 degrees to about 60 degrees, or any value or range of values therebetween. For example, where the protrusions 71 extend inward of and substantially perpendicular to the wall 54 of the piping component 10, the sealing element 70 may rotate about 90 degrees. The rotation of the sealing element 70 may occur when the protrusions 71 are contacted by the first end 128 of the pipe 100 upon insertion of the pipe 100 within the piping component 10. The sealing element 70 is configured to rotate as the pipe 100 is inserted within the piping component 10 until the protrusions 71 are free of contact with the pipe 100 or abut the inner surface 30 of the wall 54.

Referring now to FIGS. 7A and 7B, the sealing element 70 configured to be inserted into the sealing recess 26 of the piping component 10 may include a sealing element thickness $T_{SE}$. In some embodiments, wherein the sealing element 70 has a generally circular cross-sectional profile that is interrupted by the protrusions 71, as illustrated in FIG. 7B, the sealing element thickness $T_{SE}$ may be a diameter of the circular profile of the sealing element 70. In various implementations, the sealing element 70 may have at least one of a variety of sealing element thicknesses $T_{SE}$. For example, it is contemplated that the sealing element thickness $T_{SE}$ of a first sealing element 70 that is configured for insertion into a sealing recess 26 of a piping component 10 of a first size may be different than that of a second sealing element 70 that is configured for insertion into a piping component 10 of a second size. As illustrated in Table 1 below, Minimum Sealing Element Thickness Values are given for sealing elements 70 that are configured to be inserted into piping components 10 that are sized to be press fit with pipes 100 of certain diameters D5.

TABLE 1

| Pipe Diameter (inches) | Minimum Sealing Element Thickness Value (inches) |
| --- | --- |
| 0.25 | 0.063 |
| 0.3125 | 0.065 |
| 0.375 | 0.070 |
| 0.5 | 0.070 |
| 0.625 | 0.112 |
| 0.75 | 0.116 |
| 0.875 | 0.116 |
| 1.125 | 0.120 |
| 1.375 | 0.120 |

In some examples, wherein the sealing element 70 is configured for insertion into piping components 10 that correspond with pipes 100 having one of the pipe diameters D5 listed in Table 1, the sealing element thickness $T_{SE}$ of the sealing element 70 may be about equal to and not less than the corresponding Minimum Sealing Element Thickness Value listed in Table 1. For example, for a sealing element 70 that is configured to be inserted into a piping component 10 that corresponds with a pipe 100 that has a pipe diameter D5 of 0.5 inches, the sealing element thickness $T_{SE}$ of the sealing element 70 may be about equal to and not less than 0.070 inches. Further, for a sealing element 70 that is configured to be inserted into a piping component 10 that corresponds with a pipe 100 that has a pipe diameter D5 of 1.125 inches, the sealing element thickness $T_{SE}$ of the sealing element 70 may be about equal to and not less than 0.120 inches. In an exemplary embodiment, wherein the sealing element 70 is configured to be inserted into a piping component 10 that corresponds with a pipe 100 that has a pipe diameter D5 of 1.125 inches, the sealing element thickness $T_{SE}$ of the sealing element 70 may be between 0.120 inches and 0.130 inches.

In the claims of the present disclosure, a recitation of "the sealing element thickness of the sealing element is about equal to and not less than a Minimum Sealing Element Thickness Value of the sealing element" is to be understood as meaning that, for a sealing element 70 configured for insertion into piping components 10 that correspond with pipes 100 having one of the pipe diameters D5 listed in Table 1, the sealing element thickness $T_{SE}$ of the sealing element 70 is about equal to and not less than the corresponding Minimum Sealing Element Thickness Value listed in Table 1.

Figure 8B:
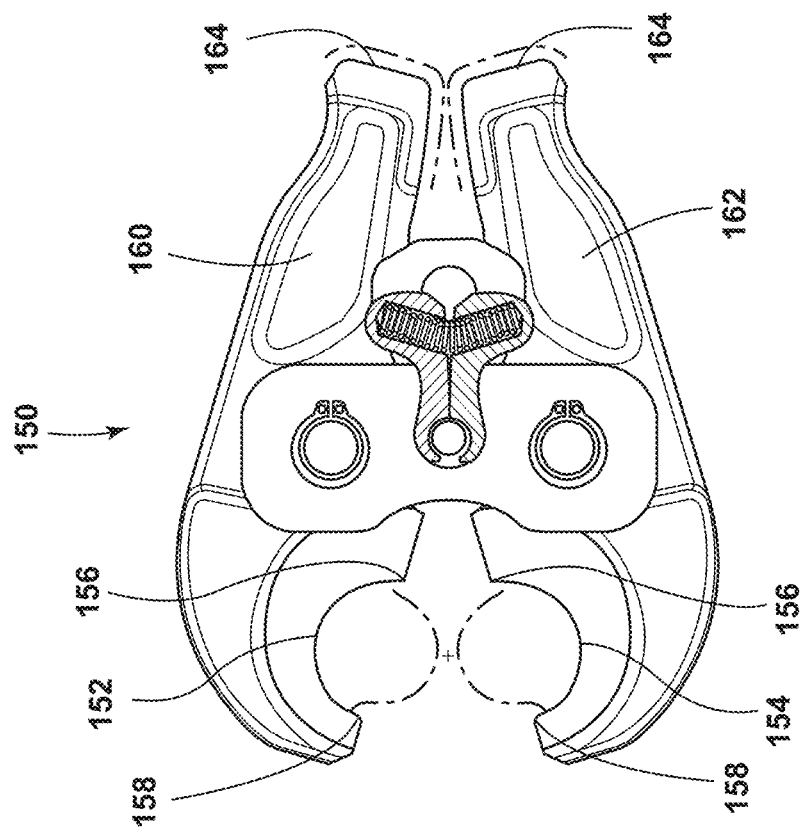
FIG. 8B is a side elevational view of the pressing tool, illustrating the first and second pressing jaws in an open condition.
Figure 8A:
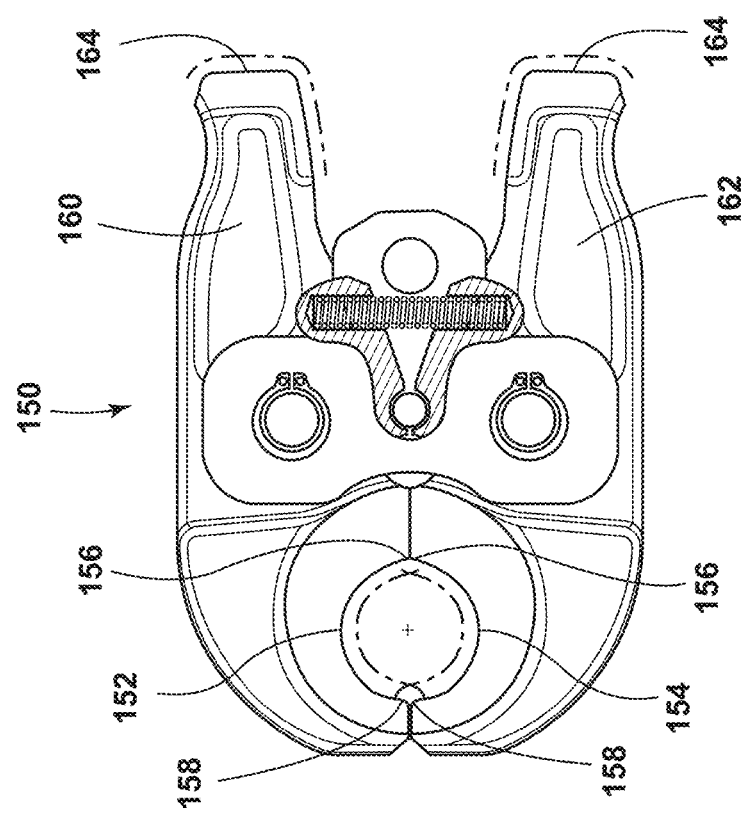
FIG. 8A is a side elevational view of a pressing tool, illustrating first and second pressing jaws of the pressing tool in a closed condition.

Referring now to FIGS. 8A and 8B, a pressing tool 150 for press joining the piping component 10 with the pipe 100 is illustrated. The pressing tool 150 includes first and second pressing jaws 152, 154. The first and second pressing jaws 152, 154 each have a proximal end 156 and a distal end 158 and are operable between open and closed conditions. In the open condition, the distal ends 158 are separated from each other. In the closed condition, the distal ends 158 are in contact with each other. In various implementations, the first and second pressing jaws 152, 154 may be operable to enter and exit the open and closed conditions via pivotal movement of at least one of the first and second pressing jaws 152, 154. For example, as illustrated in FIGS. 8A and 8B, both the first and second pressing jaws 152, 154 are operable to pivot between open and closed conditions. In some examples, one of the first and second pressing jaws 152, 154 may pivot to move the first and second pressing jaws 152, 154 between the open and closed conditions while the other remains generally stationary. Various embodiments are contemplated.

In the embodiment illustrated in FIGS. 8A and 8B, the pressing tool 150 includes first and second grip handles 160, 162 that are respectively coupled to the first and second pressing jaws 152, 154. The first and second grip handles 160, 162 generally extend from the first and second pressing jaws 152, 154 to grip handle ends 164 that are distal from the first and second pressing jaws 152, 154. The grip handle ends 164 of the first and second grip handles 160, 162 may be further from the distal ends 158 of the first and second pressing jaws 152, 154 than the proximal ends 156 of the first and second pressing jaws 152, 154. In other words, the proximal ends 156 of the first and second pressing jaws 152, 154 may be nearer to the grip handle ends 164 of the first and second grip handles 160, 162 than the distal ends 158 of the first and second pressing jaws 152, 154. For example, as illustrated in FIG. 8A, the proximal end 156 of the first pressing jaw 152 is generally between the distal end 158 of the first pressing jaw 152 and the grip handle end 164 of the first grip handle 160.

Referring still to FIGS. 8A and 8B, in various embodiments, the grip handle ends 164 of the first and second grip handles 160, 162 are nearer to each other in the open condition of the first and second pressing jaws 152, 154, as illustrated in FIG. 8B, than the closed condition of the first and second pressing jaws 152, 154, as illustrated in FIG. 8A. In such embodiments, a user may move the first and second pressing jaws 152, 154 from the closed condition to the open condition by squeezing the first and second grip handles 160, 162, such that the grip handle ends 164 move nearer to each other. In some embodiments, the first and second pressing jaws 152, 154 of the pressing tool 150 may be biased toward the closed condition. Further, in various embodiments, the pressing tool 150 may be configured for operable engagement with a pressing actuator (not shown). The pressing actuator may be configured to actuate to forcefully move the first and/or second pressing jaws 152, 154 of the pressing tool 150 from the open condition to the closed condition for the purpose of press fitting the piping component 10 with the pipe 100, in various implementations. Various types of pressing actuators are contemplated (e.g., electrical, hydraulic, etc.).

Referring now to FIGS. 9A-10C, an exemplary embodiment of the first pressing jaw 152 is illustrated. The first pressing jaw 152 includes a generally concave engagement surface 166 that extends from the proximal end 156 to the distal end 158 of the first pressing jaw 152 generally semi-circumferentially. The engagement surface 166 of the first pressing jaw 152 may include a plurality of pressing geometries that extend generally semi-circumferentially between the proximal and distal ends 156, 158 of the first pressing jaw 152. In various embodiments, the first pressing jaw 152 includes a first pressing geometry 168 that forms a first end-crimping portion 170 configured to crimp the first end 22 of the piping component 10.

Figure 9B:
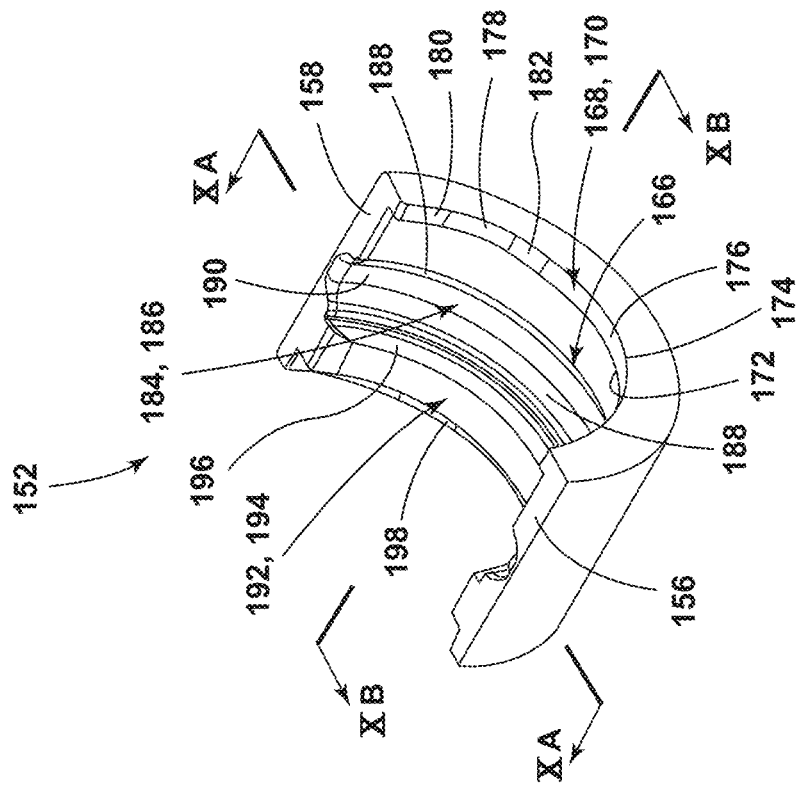
FIG. 9B is a front perspective view of the first pressing jaw.
Figure 9A:
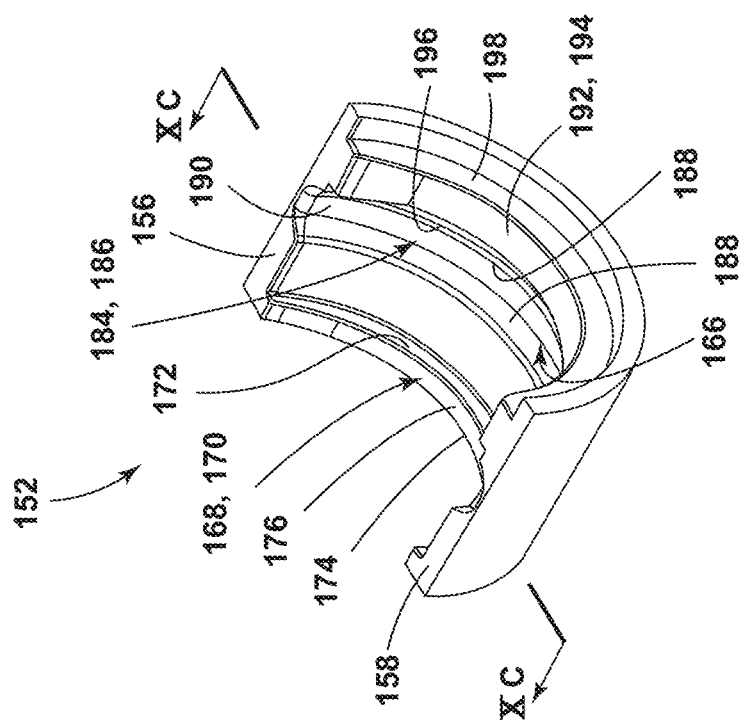
FIG. 9A is a rear perspective view of the first pressing jaw, illustrating an engagement surface having a plurality of pressing geometries.
Figure 10C:
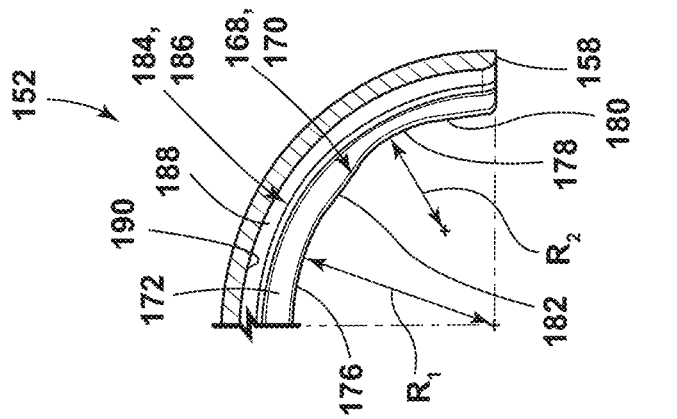
FIG. 10C is a cross-sectional view of a portion of the first pressing jaw, taken through line XC-XC of FIG. 9A.
Figure 10B:
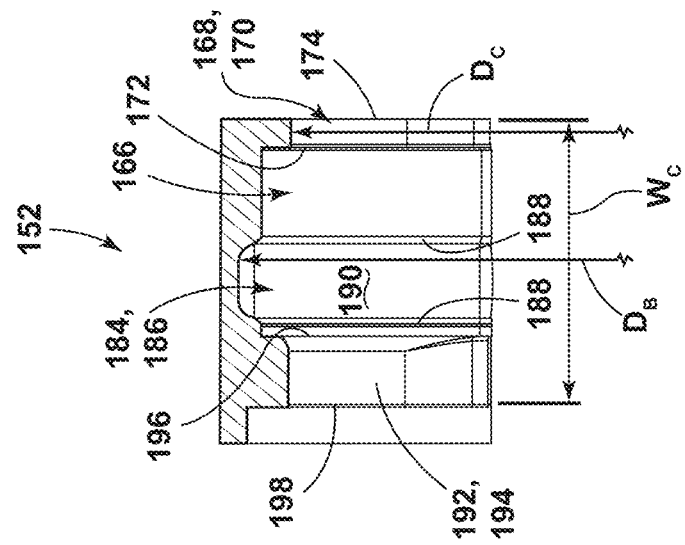
FIG. 10B is a cross-sectional view of the first pressing jaw taken through line XB-XB shown in FIG. 9B.
Figure 10A:
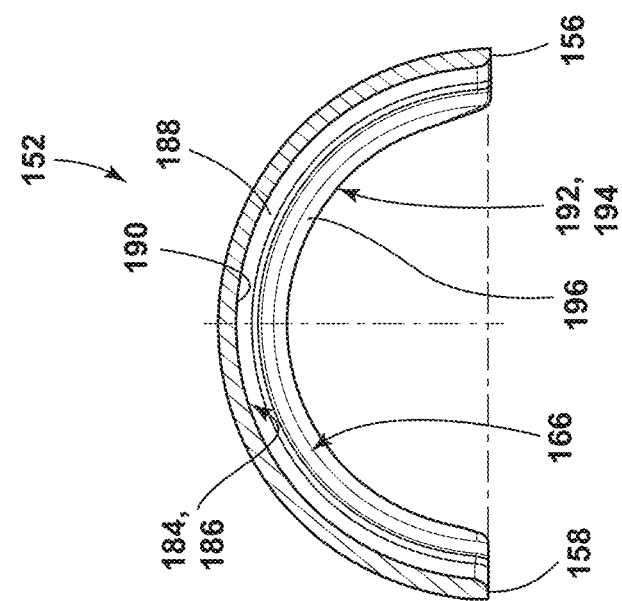
FIG. 10A is a cross-sectional view of the first pressing jaw taken through line XA-XA shown in FIG. 9B.

As illustrated in FIGS. 9A, 9B, and 10B, the first pressing geometry 168 extends axially from an inner periphery 172 to an outer periphery 174. In the illustrated embodiment, the outer periphery 174 is first pressing jaw 152-outboard of the inner periphery 172 in an axial direction. In various embodiments, the first end-crimping portion 170 may include one or more sections disposed along portions of the generally semi-circumferential extent of the first end-crimping portion 170 between the proximal and distal ends 156, 158 of the first pressing jaw 152. For example, in some implementations, the first end-crimping portion 170 may include a first section 176 positioned between the proximal and distal ends 156, 158 of the first pressing jaw 152, a second section 178 positioned between the first section 176 and the distal end 158 of the first pressing jaw 152, and a third section 180 positioned between the second section 178 and the distal end 158 of the first pressing jaw 152.

In various embodiments, the first section 176 may have a curvature of a first radius R1, and the second section 178 may have a curvature of a second radius R2, wherein the second radius R2 is less than the first radius R1. In some embodiments, the second section 178 may be adjacent to and recessed relative to the first section 176 and/or the third section 180. In some embodiments, one or more sections of the first end-crimping portion 170 may be positioned between the first section 176 and the second section 178 and/or the third section 180 and the second section 178. For example, in the embodiment illustrated in FIGS. 9B and 10C, the first end-crimping portion 170 of the first pressing jaw 152 includes first, second, third, and fourth sections 176, 178, 180, 182. The third section 180 extends between the second section 178 and the proximal end 156 of the first pressing jaw 152. The second section 178 extends from the third section 180 to a fourth section 182 positioned between the second section 178 and the first section 176. The first section 176 extends from the fourth section 182 toward the proximal end 156 of the first pressing jaw 152. As illustrated in FIG. 10C, the fourth section 182 is generally planar, and the second section 178 is adjacent to and recessed relative to the third and fourth sections 180, 182.

In various embodiments, the second section 178 may have a curvature of at least one of a host of radii. For example, it is contemplated that the second section 178 radius R2 of a first pressing tool 150 that is configured to press fit piping components 10 with pipes 100 of a first size may be different than the second section 178 radius R2 of a second pressing tool 150 that is configured to press fit piping components 10 with pipes 100 of a second size. In some embodiments, the radius R2 of the second section 178 may be greater than about 7.9 millimeters (mm). In some embodiments, the radius R2 of the second section 178 may be about 8.0 mm. In some embodiments, the radius R2 of the second section 178 may be about 8.0 mm and/or not less than 7.9 mm. In some embodiments, wherein the pressing tool 150 is configured to press fit piping components 10 with pipes 100 having diameters D5 of about 1.125 inches, the radius R2 of the second section 178 may be about 8.0 mm and/or not less than 7.9 mm. In some embodiments, wherein the pressing tool 150 is configured to press fit piping components 10 with pipes 100 having diameters D5 of about 1.375 inches, the radius R2 of the second section 178 may be about 8.0 mm and/or not less than 7.9 mm.

Referring still to FIGS. 9A-10C, the radius R2 of the second section 178 may be less than the radius R1 of the first section 176 of the first end-crimping portion 170. The first section 176 radius R1 may be at least one of a variety of radii, in various implementations. For example, it is contemplated that the first section 176 radius R1 of a first pressing tool 150 that is configured to press fit piping components 10 with pipes 100 of a first size may be different than the first section 176 radius R1 of a second pressing tool 150 that is configured to press fit piping components 10 with pipes 100 of a second size. In some embodiments, wherein the pressing tool 150 is configured to press fit piping components 10 with pipes 100 having diameters D5 of about 1.125 inches, the radius R1 of the first section 176 may be about 14.5 mm and/or not greater than 14.55 mm. In some embodiments, wherein the pressing tool 150 is configured to press fit piping components 10 with pipes 100 having diameters D5 of about 1.375 inches, the radius R1 of the first section 176 may be about 17.85 mm and/or not greater than 17.9 mm. In various embodiments, the radius R1 of the first section 176 may be half of a crimp diameter $D_C$ of the first end-crimping portion 170, as described further herein.

Referring now to FIGS. 9A-10C, the first pressing jaw 152 includes a second pressing geometry 184 that forms a sealing recess-pressing portion 186 configured to press the sealing recess wall 54d that defines the sealing recess 26 of the piping component 10. As illustrated in FIGS. 9A and 9B, the second pressing geometry 184 (i.e., the sealing recess-pressing portion 186) is recessed relative to the portions of the engagement surface 166 of the first pressing jaw 152 that are axially adjacent to the second pressing geometry 184. In the illustrated embodiment, the second pressing geometry 184 includes opposite side walls 188 that extend from the axially adjacent portions of the engagement surface 166 to a connecting wall 54 therebetween, such that the recessed sealing recess-pressing portion 186 is formed.

As further illustrated in FIGS. 9A and 9B, the first pressing geometry 168 (i.e., the first end-crimping portion 170) protrudes outward relative to the portion of the engagement surface 166 of the first pressing jaw 152 that is axially adjacent to the inner periphery 172 of the first pressing geometry 168. As illustrated, the first pressing geometry 168 is spaced apart axially from the second pressing geometry 184, such that the outer periphery 174 is further than the inner periphery 172 of the first pressing geometry 168 from the second pressing geometry 184. As such, the first pressing geometry 168 extends axially from the inner periphery 172 that is a first distance from the second pressing geometry 184 to the outer periphery 174 that is a second distance from the second pressing geometry 184, wherein the second distance is greater than the first distance.

Referring still to FIGS. 9A-10C, the first pressing jaw 152 may include a third pressing geometry 192 that forms a body-crimping portion 194 configured to crimp the body 18 of the piping component 10. The third pressing geometry 192 (i.e., the body-crimping portion 194) is spaced apart axially from the first pressing geometry 168, such that the second pressing geometry 184 is positioned axially between the first and third pressing geometries 168, 192. The third pressing geometry 192 includes an inner periphery 196 and an outer periphery 198. As illustrated in FIGS. 9A and 9B, the third pressing geometry 192 extends axially from the inner periphery 196 that is a third distance from the second pressing geometry 184 to the outer periphery 198 that is a fourth distance from the second pressing geometry 184, wherein the fourth distance is greater than the third distance. The third pressing geometry 192 may protrude outward relative to the one or more portions of the engagement surface 166 of the first pressing jaw 152 that are axially adjacent to the inner and/or outer peripheries 196, 198 of the third pressing geometry 192.

Referring now to FIG. 10B, a distance that the outer periphery 174 of the first pressing geometry 168 of the first pressing jaw 152 is axially spaced apart from the outer periphery 198 of the third pressing geometry 192 of the first pressing jaw 152 defines a crimp width $W_C$ of the pressing tool 150. Various implementations of the pressing tool 150 may have various crimp widths $W_C$. Further, it is contemplated that the crimp width $W_C$ of a first pressing tool 150 that is configured to press fit piping components 10 with pipes 100 of a first size may be different than that of a second pressing tool 150 that is configured to press fit piping components 10 with pipes of a second size. As illustrated in Table 2 below, Maximum Crimp Width Values are given for pressing tools 150 that are sized to press fit piping components 10 with pipes 100 of certain diameters D5.

TABLE 2

| Pipe Diameter (inches) | Maximum Crimp Width Value (mm) |
|---|---|
| 0.25 | 10.6 |
| 0.3125 | 10.6 |
| 0.375 | 11.1 |
| 0.5 | 12.1 |
| 0.625 | 14.1 |
| 0.75 | 16 |
| 0.875 | 18 |
| 1.125 | 20.6 |
| 1.375 | 20.6 |

In some examples, wherein the pressing tool 150 is configured to press fit piping components 10 with pipes 100 having one of the pipe diameters D5 listed in Table 2, the crimp width $W_C$ of the pressing tool 150 may be about equal to and not greater than the corresponding Maximum Crimp Width Value of the pressing tool 150. For example, for a pressing tool 150 that is configured to press fit piping components 10 with pipes 100 that have a pipe diameter D5 of 0.5 inches, the crimp width $W_C$ of the pressing tool 150 may be about equal to and not greater than 12.1 mm. Further, for a pressing tool 150 that is configured to press fit piping components 10 with pipes 100 that have a pipe diameter D5 of 1.125 inches, the crimp width $W_C$ of the pressing tool 150 may be about equal to and not greater than 20.6 mm. In an exemplary embodiment, wherein the pressing tool 150 is configured to press fit piping components 10 with pipes 100 that have a pipe diameter D5 of 1.125 inches, the crimp width $W_C$ of the pressing tool 150 may be between 20.4 mm and 20.6 mm.

In the claims of the present disclosure, a recitation of "the crimp width of the pressing tool is about equal to and not greater than a Maximum Crimp Width Value of the pressing tool" is to be understood as meaning that, for a pressing tool 150 configured to press fit a piping component 10 with a pipe 100 that has one of the pipe diameters D5 listed in Table 2, the crimp width $W_C$ of the pressing tool 150 is about equal to and not greater than the Maximum Crimp Width Value listed in Table 2 that corresponds with the pipe diameter D5 of the pipe 100 that the pressing tool 150 is configured to press fit with the piping component 10. The crimp width $W_C$ of the pressing tool 150 being about equal to and not greater than the Maximum Crimp Width Value of the pressing tool 150 may result in improved vibration testing of press fit pipes 100 and piping components 10, as demonstrated by Example 1 and Comparative Example A provided herein.

Figure 11:
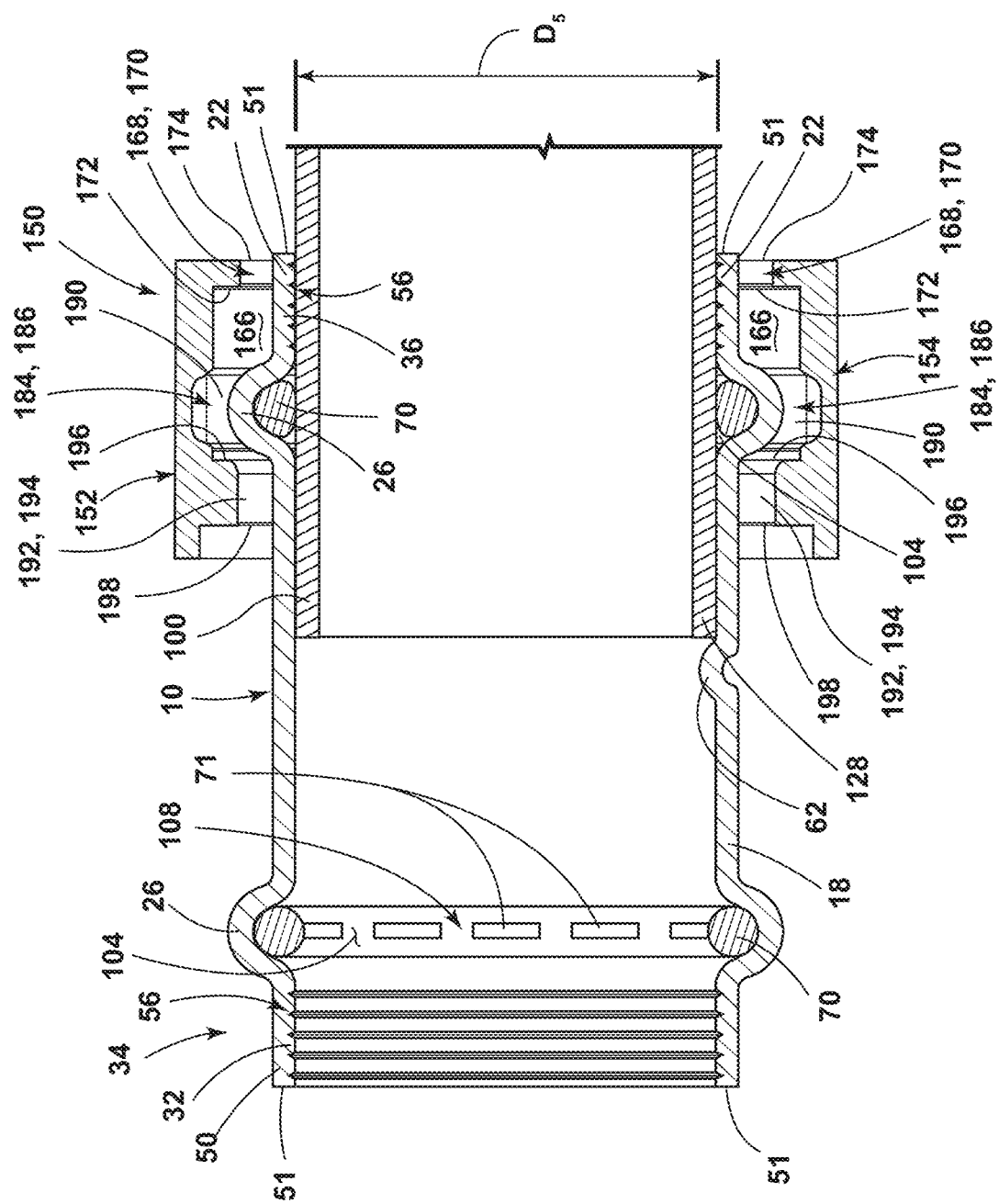
FIG. 11 is a cross-sectional view of the first and second pressing jaws of the pressing tool positioned about the press fitting assembly, according to various examples.

In various embodiments, at least portions of the engagement surfaces 166 of the first and second pressing jaws 152, 154 may be generally symmetrical to each other. For example, in various implementations, the second pressing jaw 154 may include first, second, and third pressing geometries 168, 184, 192 that are symmetrical with the first, second, and third pressing geometries 168, 184, 192 of the first pressing jaw 152, as illustrated in FIG. 11. In such implementations, the first, second, and third pressing geometries 168, 184, 192 may be aligned with each other when the first and second pressing jaws 152, 154 are in the closed condition.

Referring now to FIG. 10B, the pressing tool 150 may include a crimp diameter $D_C$. In some embodiments, a distance twice the radius R1 of the curvature of the first section 176 of the first end-crimping portion 170 of the first pressing jaw 152 defines the crimp diameter $D_C$. In some embodiments, the distance between a point on the first section 176 of the first end-crimping portion 170 of the first pressing jaw 152 and an opposite point on the first section 176 of the first end-crimping portion 170 of the second pressing jaw 154, when the first and second pressing jaws 152, 154 are in the closed condition, defines the crimp diameter $D_C$ of the pressing tool 150. For example, in an exemplary embodiment, the distance between a semi-circumferential midpoint of the first end-crimping portion 170 of the first pressing jaw 152 between the proximal and distal ends 156, 158 of the first pressing jaw 152 and a semi-circumferential midpoint of the first end-crimping portion 170 of the second pressing jaw 154 between the proximal and distal ends 156, 158 of the second pressing jaw 154, when the first and second pressing jaws 152, 154 are in the closed condition, defines the crimp diameter $D_C$ of the pressing tool 150.

Various implementations of the pressing tool 150 may have various crimp diameters $D_C$. Further, it is contemplated that the crimp diameter $D_C$ of a first pressing tool 150 that is configured to press fit piping components 10 with pipes 100 of a first size may be different than that of a second pressing tool 150 that is configured to press fit piping components 10 with pipes 100 of a second size. As illustrated in Table 3 below, Maximum Crimp Diameter Values are given for pressing tools 150 that are sized to press fit piping components 10 with pipes 100 of certain diameters D5.

TABLE 3

| Pipe Diameter (inches) | Maximum Crimp Diameter Value (mm) |
| --- | --- |
| 0.25 | 7.8 |
| 0.3125 | 9.2 |
| 0.375 | 10.8 |
| 0.5 | 13.7 |
| 0.625 | 17.1 |
| 0.75 | 20.5 |
| 0.875 | 23.6 |
| 1.125 | 29.1 |
| 1.375 | 35.8 |

In some examples, wherein the pressing tool 150 is configured to press fit piping components 10 with pipes 100 having one of the pipe diameters D5 listed in Table 3, the crimp diameter $D_C$ of the pressing tool 150 may be about equal to and not greater than the corresponding Maximum Crimp Diameter Value of the pressing tool 150. For example, for a pressing tool 150 that is configured to press fit piping components 10 with pipes 100 that have a pipe diameter D5 of 0.5 inches, the crimp diameter $D_C$ of the pressing tool 150 may be about equal to and not greater than 13.7 mm. Further, for a pressing tool 150 that is configured to press fit piping components 10 with pipes 100 that have a pipe diameter D5 of 1.125 inches, the crimp diameter $D_C$ of the pressing tool 150 may be about equal to and not greater than 29.1 mm.

In the claims of the present disclosure, a recitation of "the crimp diameter is about equal to and not greater than a Maximum Crimp Diameter Value of the pressing tool" is to be understood as meaning that, for a pressing tool 150 configured to press fit a piping component 10 with a pipe 100 that has one of the pipe diameters D5 listed in Table 3, the crimp diameter $D_C$ of the pressing tool 150 is about equal to and not greater than the Maximum Crimp Diameter Value listed in Table 3 that corresponds with the pipe diameter D5 of the pipe 100 that the pressing tool 150 is configured to press fit with the piping component 10. The crimp diameter $D_C$ of the pressing tool 150 being about equal to and not greater than the Maximum Crimp Diameter Value of the pressing tool 150 may result in improved pressure testing of press fit pipes 100 and piping components 10, as demonstrated by Example 3 and Comparative Example C, provided herein.

Referring still to FIG. 10B, the pressing tool 150 may include a bead diameter $D_B$. In some embodiments, a distance twice the radius of a semi-circumferential curvature of the connecting wall 54 of the second pressing geometry 184 (i.e., the sealing recess-pressing portion 186) of the first pressing jaw 152 defines the bead diameter $D_B$. In some embodiments, the distance between a point on the connecting wall 54 of the sealing recess-pressing portion 186 of the first pressing jaw 152 and an opposite point on the connecting wall 54 of the sealing recess-pressing portion 186 of the second pressing jaw 154, when the first and second pressing jaws 152, 154 are in the closed condition, defines the bead diameter $D_B$ of the pressing tool 150. For example, in an exemplary embodiment the distance between a semi-circumferential midpoint of the connecting wall 54 of the sealing recess-pressing portion 186 of first pressing jaw 152 and a semi-circumferential midpoint on the connecting wall 54 of the sealing recess-pressing portion 186 of the second pressing jaw 154, when the first and second pressing jaws 152, 154 are in the closed condition, defines the bead diameter $D_B$ of the pressing tool 150.

Various implementations of the pressing tool 150 may have various bead diameters $D_B$. For example, the bead diameter $D_B$ of a first pressing tool 150 that is configured to press fit piping components 10 with pipes 100 of a first size may be different than that of a second pressing tool 150 that is configured to press fit piping components 10 with pipes 100 of a second size. As illustrated in Table 4 below, Maximum Bead Diameter Values are given for pressing tools 150 that are sized to press fit piping components 10 with pipes 100 of certain diameters.

TABLE 4

| Pipe Diameter (inches) | Maximum Bead Diameter Value (mm) |
| --- | --- |
| 0.25 | 10.9 |
| 0.3125 | 12.3 |
| 0.375 | 14.1 |
| 0.5 | 17.3 |
| 0.625 | 23.1 |
| 0.75 | 26.9 |
| 0.875 | 29.8 |
| 1.125 | 36.5 |
| 1.375 | 42.6 |

In some examples, wherein the pressing tool 150 is configured to press fit piping components 10 with pipes 100 having one of the pipe diameters D5 listed in Table 4, the bead diameter $D_B$ of the pressing tool 150 may be about equal to and not greater than the corresponding Maximum Bead Diameter Value of the pressing tool 150. For example, for a pressing tool 150 that is configured to press fit piping components 10 with pipes 100 that have a pipe diameter D5 of 0.5 inches, the bead diameter $D_B$ of the pressing tool 150 may be about equal to and not greater than 17.3 mm. Further, for a pressing tool 150 that is configured to press fit piping components 10 with pipes 100 that have a pipe diameter D5 of 1.125 inches, the bead diameter $D_B$ of the pressing tool 150 may be about equal to and not greater than 36.5 mm.

In the claims of the present disclosure, a recitation of "the bead diameter is about equal to and not greater than a Maximum Bead Diameter Value of the pressing tool" is to be understood as meaning that, for a pressing tool 150 configured to press fit a piping component 10 with a pipe 100 that has one of the pipe diameters D5 listed in Table 4, the bead diameter $D_B$ of the pressing tool 150 is about equal to and not greater than the Maximum Bead Diameter Value listed in Table 4 that corresponds with the pipe diameter D5 of the pipe 100 that the pressing tool 150 is configured to press fit with the piping component 10. The bead diameter $D_B$ of the pressing tool 150 being about equal to and not greater than the Maximum Bead Diameter Value of the pressing tool 150 may result in improved leak testing of press fit pipes 100 and piping components 10 when compared with the use of pressing tools 150 with bead diameter $D_B$ having greater than Maximum Bead Diameter Values.

Referring now to FIG. 11, in operation of the pressing tool 150, a user initially inserts the sealing element 70 into the sealing recess 26 defined by the sealing recess wall 54d adjacent to the first end 22 of the piping component 10. Next, the user inserts the pipe 100 into the open first end 22 of the piping component 10. During insertion of the pipe 100, the pipe 100 contacts the protrusions 71 extending inward from the sealing element 70. The resulting interference between the pipe 100 and the protrusions 71 causes the sealing element 70 to rotate within the sealing recess 26 as the pipe 100 is inserted. Insertion is completed when the pipe 100 abuts the stop 62 coupled to the body 18 of the piping component 10.

Next, the user moves the first and second pressing jaws 152, 154 of the pressing tool 150 to the open condition and positions the first and second pressing jaws 152, 154 of the pressing tool 150 about the piping component 10 and pipe 100 inserted therein, as illustrated in FIG. 11. The body-crimping portion 194 formed by the third pressing geometries 192 of the first and second pressing jaws 152, 154 are aligned with the body 18 of the piping component 10, the sealing recess-pressing portions 186 formed by the second pressing geometries 184 of the first and second pressing jaws 152, 154 are aligned with the sealing recess wall 54d adjacent to the first end 22 of the piping component 10, and the first end-crimping portions 170 formed by the first pressing geometries 168 of the first and second pressing jaws 152, 154 are aligned with the first end 22 of the piping component 10. As illustrated in FIG. 11, when the sealing recess-pressing portion 186 is correctly aligned with the sealing recess wall 54d of the piping component 10, the outer peripheries 174 of the first pressing geometries 168 of the first and second pressing jaws 152, 154 (i.e., the first end-crimping portions 170) are positioned axially between the rim 51 of the first end 22 and the sealing recess wall 54d of the piping component 10.

Next, the user causes the first and second pressing jaws 152, 154 to move from the open condition to the closed condition to press fit the piping component 10 and the pipe 100 (e.g., prompts actuation of the pressing actuator engaged with the pressing tool 150). As the first and second pressing jaws 152, 154 move to the closed condition, the first end-crimping portions 170 of the first and second pressing jaws 152, 154 crimp the first end 22 of the piping component 10 between the rim 51 and the sealing recess wall 54d, the sealing recess-pressing portions 186 press the sealing recess wall 54d of the piping component 10, and the body-crimping portions 194 crimp the body 18 of the piping component 10. As a result, the sealing element 70 is compressed between the pipe 100 and the piping component 10, and a seal is created. Finally, the user moves the first and second pressing jaws 152, 154 back to the open condition and removes the pressing tool 150 from about the piping component 10.

Figure 12:
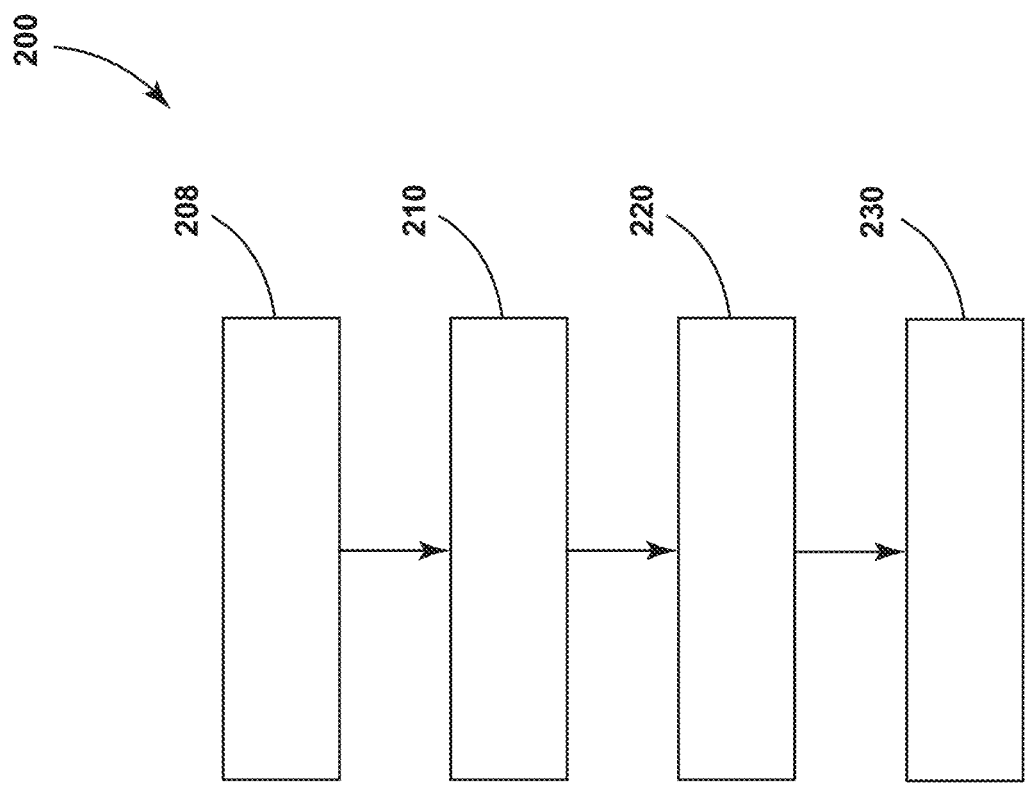
FIG. 12 is a block diagram of a method of press joining a piping component with a pipe via a pressing tool.

Referring now to FIG. 12, a method 200 of press joining a piping component 10 with a pipe 100 via a pressing tool 150 is disclosed. The method 200 may include the step 208 of inserting the sealing element 70 into the sealing recess 26 defined by the sealing recess wall 54d of the piping component 10. In various embodiments, the sealing element 70 has a sealing element thickness $T_{SE}$ and the sealing element thickness $T_{SE}$ of the sealing element 70 is about equal to and not less than a Minimum Sealing Element Thickness Value of the sealing element 70.

Referring still to FIG. 12, the method 200 of press joining a piping component 10 with a pipe 100 via a pressing tool 150 may further include the step 210 of inserting the pipe 100 into the piping component 10. The pipe 100 may be inserted into the open first end 22 of the piping component 10. In some implementations, the pipe 100 may be inserted into the open second end 50 of the piping component 10.

Referring still to FIG. 12, the method 200 of press joining a piping component 10 with a pipe 100 via a pressing tool 150 may further include the step 220 of pressing the pipe 100 and the piping component 10 with the pressing tool 150. In some implementations, in the step 220 of pressing the pipe 100 and piping component 10 with the pressing tool 150, the pipe 100 and piping component 10 may be pressed, such that the sealing recess-pressing portion 186 of the pressing tool 150 presses a sealing recess wall 54d of the piping component 10, and the first end-crimping portion 170 of the pressing tool 150 crimps the open first end 22 of the piping component 10 between the sealing recess wall 54d and the rim 51 of the first end 22 that is positioned distally from the sealing recess wall 54d. Further, in some implementations, in the step 220 of pressing the pipe 100 and piping component 10 with the pressing tool 150, the pipe 100 and piping component 10 may be pressed, such that the pipe 100 is operable to withstand 2 million vibration cycles at an amplitude of 0.125 inches and a frequency of 16.67 Hertz under a UL 109 vibration test without breakage along the rim 51 of the first end 22.

As illustrated in FIGS. 8A and 8B, in various embodiments, the pressing tool 150 includes the first and second pressing jaws 152, 154 that are operable between the open and closed conditions. The first pressing jaw 152 may include the first pressing geometry 168 that forms the first end-crimping portion 170, and the second pressing geometry 184 that forms the sealing recess-pressing portion 186. The first pressing geometry 168 may be spaced apart axially from the second pressing geometry 184 and may extend axially from the inner periphery 172 of the first pressing geometry 168 to the outer periphery 174 of the first pressing geometry 168. As described above, the inner periphery 172 may be a first distance from the second pressing geometry 184, and the outer periphery 174 may be a second distance from the second pressing geometry 184, wherein the second distance is greater than the first distance. In some implementations, in the step of pressing the pipe 100 and the piping component 10, the outer periphery 174 of the first pressing geometry 168 contacts the first end 22 between the rim 51 and the sealing recess wall 54d, such that the first end 22 is crimped between the rim 51 of the first end 22 and the sealing recess wall 54d adjacent to the first end 22.

As described herein and illustrated in FIG. 10B, in some embodiments, the first pressing jaw 152 further includes the third pressing geometry 192 that forms the body-crimping portion 194. The third pressing geometry 192 may be spaced apart axially from the first pressing geometry 168, such that the second pressing geometry 184 is positioned axially between the first and third pressing geometries 168, 192. As illustrated in FIG. 10B, the third pressing geometry 192 extends axially away from the second pressing geometry 184 from the inner periphery 196 of the third pressing geometry 192 to the outer periphery 198 of the third pressing geometry 192.

Referring now to FIG. 12, the method of press joining a piping component 10 with a pipe 100 via a pressing tool 150 may further include the step 230 of rotating the sealing element 70 received within the sealing recess 26 of the piping component 10 defined by the sealing recess wall 54d, wherein the rotation of the sealing element 70 is prompted by interference between the pipe 100 and at least one protrusion 71 extending from the inner surface 104 of the sealing element 70 as the pipe 100 is inserted into the piping component 10.

EXAMPLES

The following are non-limiting examples of a piping component pressed with a pipe via a pressing tool.

Comparative Example A

In one example (Ex. A), a plurality of piping components of varying sizes were pressed with a plurality of pipes of correspondingly varied diameters by pressing tools of corresponding sizes. The plurality of pipes included pipes having diameters of 0.625", 0.875", 1.125", and 1.375", and each pipe was formed of annealed ACR tubing. The corresponding piping components were sized to fit with the plurality of pipes and were exemplary of the properties of the piping components of this disclosure. The pressing tools were generally modeled after the pressing tools described herein, but the crimp width $W_C$ of each pressing tool was greater than the corresponding Maximum Crimp Width Value, shown in Table 2. For example, the crimp width $W_C$ of the pressing tool utilized to press the 0.875" pipe and the correspondingly sized piping component had a crimp width $W_C$ of about 20 mm, which is greater than the Maximum Crimp Width Value of the correspondingly sized pressing tool (18.0 mm). Each piping component was subjected to a vibration test in accordance with UL Standard 109, wherein the piping components were subject to 1.8 million vibration cycles at 16.67 Hz and an amplitude of 0.125" (0.25" of total travel). A piping component was deemed to have "passed" the vibration test if repair or replacement of the piping component was unnecessary after the vibration test. Conversely, a piping component was deemed to have "failed" the vibration test if repair or replacement of the piping component was necessary after the vibration test. The test results for Ex. A are shown below in Table 5.

TABLE 5

| Sample | Pipe Diameter (inches) | Pass/Fail |
| --- | --- | --- |
| A-1 | 0.625 | Pass |
| A-2 | 0.625 | Pass |
| A-3 | 0.625 | Pass |

TABLE 5-continued

| Sample | Pipe Diameter (inches) | Pass/Fail |
| --- | --- | --- |
| A-4 | 0.875 | Pass |
| A-5 | 0.875 | Pass |
| A-6 | 0.875 | Fail |
| A-7 | 1.125 | Pass |
| A-8 | 1.125 | Pass |
| A-9 | 1.125 | Pass |
| A-10 | 1.375 | Fail |
| A-11 | 1.375 | Fail |
| A-12 | 1.375 | Fail |

As shown in Table 5, one of the piping components pressed with the 0.875" diameter pipe (sample A-7) and each of the piping components pressed with the 1.375" diameter pipes (samples A-10, A-11, A-12) failed the vibration test.

Example 1

In another example (Ex. 1), a plurality of piping components of varying sizes were pressed with a plurality of pipes of correspondingly varied diameters by pressing tools of corresponding sizes. The plurality of pipes included pipes having diameters of 0.25", 0.3125", 0.375", 0.50", 0.625", 0.75" 0.875", and 1.125", and each pipe was formed of annealed ACR tubing. The corresponding piping components were sized to fit with the plurality of pipes and were exemplary of the properties of the piping components of this disclosure. The pressing tools were exemplary of the pressing tools described herein, such that the crimp width We of each pressing tool was about equal to and not greater than the corresponding Maximum Crimp Width Value, shown in Table 2. Each piping component was subjected to a vibration test in accordance with UL Standard 109, wherein the piping components were subject to 2.0 million vibration cycles at 16.67 Hz and an amplitude of 0.125" (0.25" of total travel). A piping component was deemed to have "passed" the vibration test if repair or replacement of the piping component was unnecessary after the vibration test. Conversely, a piping component was deemed to have failed the vibration test if repair or replacement of the piping component was necessary after the vibration test. The test results for Ex. 1 are shown below in Table 6.

TABLE 6

| Sample | Pipe Diameter (inches) | Pass/Fail |
| --- | --- | --- |
| 1-1 | 0.25 | Pass |
| 1-2 | 0.25 | Pass |
| 1-3 | 0.25 | Pass |
| 1-4 | 0.3125 | Pass |
| 1-5 | 0.3125 | Pass |
| 1-6 | 0.3125 | Pass |
| 1-7 | 0.375 | Pass |
| 1-8 | 0.375 | Pass |
| 1-9 | 0.375 | Pass |
| 1-10 | 0.50 | Pass |
| 1-11 | 0.50 | Pass |
| 1-12 | 0.50 | Pass |
| 1-13 | 0.625 | Pass |
| 1-14 | 0.625 | Pass |
| 1-15 | 0.625 | Pass |
| 1-16 | .75 | Pass |
| 1-17 | .75 | Pass |
| 1-18 | .75 | Pass |
| 1-19 | 0.875 | Pass |

TABLE 6-continued

| Sample | Pipe Diameter (inches) | Pass/Fail |
|---|---|---|
| 1-20 | 0.875 | Pass |
| 1-21 | 0.875 | Pass |
| 1-22 | 1.125 | Pass |
| 1-23 | 1.125 | Pass |
| 1-24 | 1.125 | Pass |

As shown in Table 6, in Ex. 1, each of the piping components passed the vibration test, wherein each piping component was subjected to 2.0 million vibration cycles, including the piping components pressed with the 0.875" diameter pipes (samples 1-19, 1-20, and 1-21). Compared against the results of the vibration tests conducted in Ex. A, wherein sample A-6 failed under, at most, 1.8 million vibration cycles, the results of the vibration testing in Ex. 1 indicate that utilizing pressing tools having crimp widths We about equal to and not greater than the corresponding Maximum Crimp Width Values increases the number of vibration cycles the piping components can be subjected to before failure occurs.

Comparative Example B

In one example (Ex. B), a plurality of piping components of varying sizes were pressed with a plurality of pipes of correspondingly varied diameters by pressing tools of corresponding sizes. The plurality of pipes included pipes having diameters of 0.875" and 1.125", and each pipe was formed of annealed ACR tubing. The corresponding piping components were sized to fit with the plurality of pipes and were exemplary of the properties of the piping components of this disclosure. The pressing tools were exemplary of the pressing tools described herein, such that the crimp width We of each pressing tool was about equal to and not greater than the corresponding Maximum Crimp Width Value, shown in Table 2, the bead diameter of each pressing tool was about equal to and not greater than the corresponding Maximum Bead Diameter Value, shown in Table 4, and the crimp diameter of each pressing tool was about equal to and not greater than the corresponding Maximum Crimp Diameter Value, shown in Table 3. Prior to insertion of the pipes into the corresponding piping components, sealing elements were inserted into the sealing recesses of the piping components. Each sealing element had a sealing element thickness $T_{SE}$ less than the corresponding Minimum Sealing Element Thickness Value, shown in Table 1. For example, the sealing element thickness $T_{SE}$ of the sealing elements utilized in the piping components that were pressed with the 1.125" pipes had a sealing element thickness $T_{SE}$ of 0.115", which is less than the corresponding Minimum Sealing Element Thickness Value shown in Table 1 (0.120").

Each piping component was subjected to a thermal cycle test, wherein the piping component is cycled between −40° C. to 121° C. and held at both temperatures for two minutes each. During the two-minute periods, the pressure within the piping component (and the attached pipes) is increased from atmospheric pressure to 700 pounds per square inch (PSI). The piping component is subjected to 50 cycles at this profile. Subsequently, the temperature is maintained at 121° C. and the pressure within the piping component is cycled from atmospheric to 700 PSI for 200 cycles. Next, the piping component is subjected to a helium leak test. In the helium leak test, the assembly is pressurized with helium to 700 PSI and then placed within a vacuum chamber that includes a helium leak detector. The helium leak detector detects helium leaking from the assembly from which the total leak rate of the helium can be deduced. Each piping component was deemed to "pass" the helium leak test if the helium leak rate test results passed the standard requirements of ISO 14903. Conversely, each piping component was deemed to "fail" the helium leak test if the helium leak rate test results failed the standard requirements of ISO 14903. Because the piping components of Ex. B were pressurized with helium to 700 PSI, leak rates less than or equal to 1.75 E-5 Pascals times meters cubed per second (Pa·m³/s) were deemed to "pass," in accordance with ISO 14903. The test results of the helium leak test are shown in Table 7 herein.

TABLE 7

| Sample | Pipe Diameter (inches) | Helium Leak Rate (Pa · m3/s) |
|---|---|---|
| B-1 | 0.875 | Pass |
| B-2 | 0.875 | Pass |
| B-3 | 0.875 | Fail |
| B-4 | 1.125 | Fail |
| B-5 | 1.125 | Fail |
| B-6 | 1.125 | Pass |

As shown in Table 7, samples B-3, B-4, and B-5 registered helium leak rates greater than 1.75 E-5 Pa·m³/s, which, within the bounds of the helium leak test, is representative of a failure.

Example 2

In another example (Ex. 2), a plurality of piping components of varying sizes were pressed with a plurality of pipes of correspondingly varied diameters by pressing tools of corresponding sizes. The plurality of pipes included pipes having diameters of 0.875" and 1.125", and each pipe was formed of annealed ACR tubing. The corresponding piping components were sized to fit with the plurality of pipes and were exemplary of the properties of the piping components of this disclosure. The pressing tools were exemplary of the pressing tools described herein, such that the crimp width We of each pressing tool was about equal to and not greater than the corresponding Maximum Crimp Width Value, shown in Table 2, the bead diameter of each pressing tool was about equal to and not greater than the corresponding Maximum Bead Diameter Value, shown in Table 4, and the crimp diameter of each pressing tool was about equal to and not greater than the corresponding Maximum Crimp Diameter Value, shown in Table 3. Prior to insertion of the pipes into the corresponding piping components, sealing elements were inserted into the sealing recesses of the piping components. Each sealing element had a sealing element thickness $T_{SE}$ about equal to and not less than the corresponding Minimum Sealing Element Thickness Value, shown in Table 1. For example, the sealing element thickness of the sealing elements utilized in the piping components that were pressed with the 1.125" pipes had a sealing element thickness of 0.124"±0.004", which is about equal to but not less than the corresponding Minimum Sealing Element Thickness Value shown in Table 1 (0.120").

Each piping component was subjected to a thermal cycle test, wherein the piping component was cycled between −40° C. to 121° C. and held at both temperatures for two minutes each. During the 2 minute periods, the pressure within the piping component (and the attached pipes) was increased from atmospheric pressure to 700 PSI. The piping component was subjected to 50 cycles at this profile. Subsequently, the temperature was maintained at 121° C. and the pressure within the piping component was cycled from atmospheric pressure to 700 PSI for 200 cycles. Next, the piping component was subjected to a helium leak test. In the helium leak test, the assembly was pressurized with helium to 700 PSI and then placed within a vacuum chamber that includes a helium leak detector. The helium leak detector detects helium leaking from the assembly from which the total leak rate of the helium can be deduced. Each piping component was deemed to "pass" the helium leak test if the helium leak rate test results passed the standard requirements of ISO 14903. Conversely, each piping component was deemed to "fail" the helium leak test if the helium leak rate test results failed the standard requirements of ISO 14903. Because the piping components of Ex. 2 were pressurized with helium to 700 PSI, leak rates less than or equal to 1.75 E-5 Pascals times meters cubed per second ($Pa \cdot m^3/s$) were deemed to "pass," in accordance with ISO 14903. The test results of the helium leak test are shown in Table 8 herein.

TABLE 8

| Sample | Pipe Diameter (inches) | Helium Leak rate ($Pa \cdot m^3/s$) |
|---|---|---|
| 2-1 | 0.875 | Pass |
| 2-2 | 0.875 | Pass |
| 2-3 | 0.875 | Pass |
| 2-4 | 0.875 | Pass |
| 2-5 | 0.875 | Pass |
| 2-6 | 0.875 | Pass |
| 2-7 | 1.125 | Pass |
| 2-8 | 1.125 | Pass |
| 2-9 | 1.125 | Pass |
| 2-10 | 1.125 | Pass |
| 2-11 | 1.125 | Pass |
| 2-12 | 1.125 | Pass |
| 2-13 | 1.125 | Pass |
| 2-14 | 1.125 | Pass |
| 2-15 | 1.125 | Pass |

As shown in Table 8, no failures occurred. Comparing the results of the tests conducted in Comparative Example B, wherein multiple assemblies failed, with the results of the tests conducted in Example 2, wherein no helium leak failures occurred, indicates that utilizing sealing elements having sealing element thicknesses $T_{SE}$ about equal to and not less than the corresponding Minimum Sealing Element Thickness Values, shown in Table 1, yields smaller leak rates with fewer failures.

Comparative Example C

In one example (Ex. C), a plurality of piping components of varying sizes were pressed with a plurality of pipes of correspondingly varied diameters by pressing tools of corresponding sizes to form assemblies. The plurality of pipes included pipes having diameters of 0.625", 0.875" and 1.125", and each pipe was formed of annealed ACR tubing. The corresponding piping components were sized to fit with the plurality of pipes and were exemplary of the properties of the piping components of this disclosure. The pressing tools were generally modeled after the pressing tools described herein, but the crimp diameter of each pressing tool was greater than the corresponding Maximum Crimp Diameter Value, shown in Table 3.

The assemblies were subjected to a pressure test, wherein each assembly was hydrostatically pressurized to 2100 PSI, and maintained at that pressure for a minute. After the minute elapsed the pressure within the assembly was increased until a portion of the assembly burst. The maximum pressure before the assembly burst was then recorded. An assembly was deemed to have passed the pressure test if the assembly did not burst before the minute elapsed while the assembly was pressurized at 2100 PSI. An assembly was deemed to have failed the pressure test if the assembly burst at any time before the minute elapsed while the assembly was pressurized at 2100 PSI. The test results of Ex. C are shown below in Table 9.

TABLE 9

| Sample | Pipe Diameter (inches) | Maximum Pressure (psi) | Pass/Fail |
|---|---|---|---|
| C-1 | 0.625 | 2296 | Pass |
| C-2 | 0.625 | 2283 | Pass |
| C-3 | 0.625 | 2298 | Pass |
| C-4 | 0.625 | 2294 | Pass |
| C-5 | 0.625 | 2205 | Pass |
| C-6 | 0.625 | 2217 | Pass |
| C-7 | 0.875 | 1939 | Fail |
| C-8 | 0.875 | 1933 | Fail |
| C-9 | 0.875 | 1936 | Fail |
| C-10 | 0.875 | 1681 | Fail |
| C-11 | 0.875 | 1518 | Fail |
| C-12 | 0.875 | 1526 | Fail |
| C-13 | 1.125 | — | Fail |
| C-14 | 1.125 | — | Fail |
| C-15 | 1.125 | — | Fail |
| C-16 | 1.125 | 809 | Fail |
| C-17 | 1.125 | 1004 | Fail |
| C-18 | 1.125 | 922 | Fail |

As shown in Table 9, samples C-7 through C-18 (each assembly that included a pipe size of 0.875" or 1.125") failed the pressure test. Maximum pressures were not recorded for samples C-13, C-14, and C-15 due to crimp joint leaking of the piping component.

Example 3

In another example (Ex. 3), a plurality of piping components of varying sizes were pressed with a plurality of pipes of correspondingly varied diameters by pressing tools of corresponding sizes to form assemblies. The plurality of pipes included pipes having diameters of 0.625", 0.875" and 1.125", and each pipe was formed of annealed ACR tubing. The corresponding piping components were sized to fit with the plurality of pipes and were exemplary of the properties of the piping components of this disclosure. The pressing tools were exemplary of the pressing tools described herein, such that the crimp diameter of each pressing tool was about equal to and not greater than the corresponding Maximum Crimp Diameter Value, shown in Table 3.

The assemblies were subjected to a pressure test, wherein each assembly was hydrostatically pressurized to 2100 PSI, and maintained at that pressure for a minute. After the minute elapsed the pressure within the assembly was increased until a portion of the assembly burst. The maximum pressure before the assembly burst was then recorded. An assembly was deemed to have passed the pressure test if the assembly did not burst before the minute elapsed while the assembly was pressurized at 2100 PSI. An assembly was deemed to have failed the pressure test if the assembly burst at any time before the minute elapsed while the assembly was pressurized at 2100 PSI. The test results of Ex. 3 are shown below in Table 10.

TABLE 10

| Sample | Pipe Diameter (inches) | Maximum Pressure (psi) | Pass/Fail |
| --- | --- | --- | --- |
| 3-1 | 0.625 | 2835.6 | Pass |
| 3-2 | 0.625 | 2826.9 | Pass |
| 3-3 | 0.625 | 2835.3 | Pass |
| 3-4 | 0.875 | 3014.7 | Pass |
| 3-5 | 0.875 | 3023.8 | Pass |
| 3-6 | 0.875 | 2907.3 | Pass |
| 3-7 | 1.125 | 2486.2 | Pass |
| 3-8 | 1.125 | 2497.6 | Pass |
| 3-9 | 1.125 | 2441.9 | Pass |

As shown in Table 10, each of the samples passed the pressure test. Further, the average maximum pressures withstood by the samples of each pipe diameter D5 in Ex. 3 were greater than the average maximum pressures withstood by the samples of each pipe diameter D5 in Ex. C. Thus, the results of the tests conducted in Ex. 3 indicate that the crimp diameter of each pressing tool being about equal to and not greater than the corresponding Maximum Crimp Diameter Value results in assemblies that are able to withstand greater amounts of pressure than assemblies pressed by pressing tools having diameters greater than the corresponding Maximum Crimp Diameter Values.

Comparative Example D

In one comparative example (Ex. D), a plurality of piping components of varying sizes were pressed with a plurality of pipes of correspondingly varied diameters by pressing tools of corresponding sizes to form assemblies. The plurality of pipes included pipes having diameters of 1.125" and 1.375". Each pipe was formed of annealed ACR tubing. The corresponding piping components were sized to fit with the plurality of pipes and were exemplary of the properties of the piping components of this disclosure. The pressing tools were generally modeled after the pressing tools described herein, but the first end-crimping portion did not include the second section having a curvature of a radius less than the radius of the first section, as described herein. Instead, the curvature of the first end-crimping portions of the first and second pressing jaws had a generally uniform radius between the proximal and distal ends of the first and second pressing jaws, respectively, as illustrated in FIG. 12.

Figure 13:
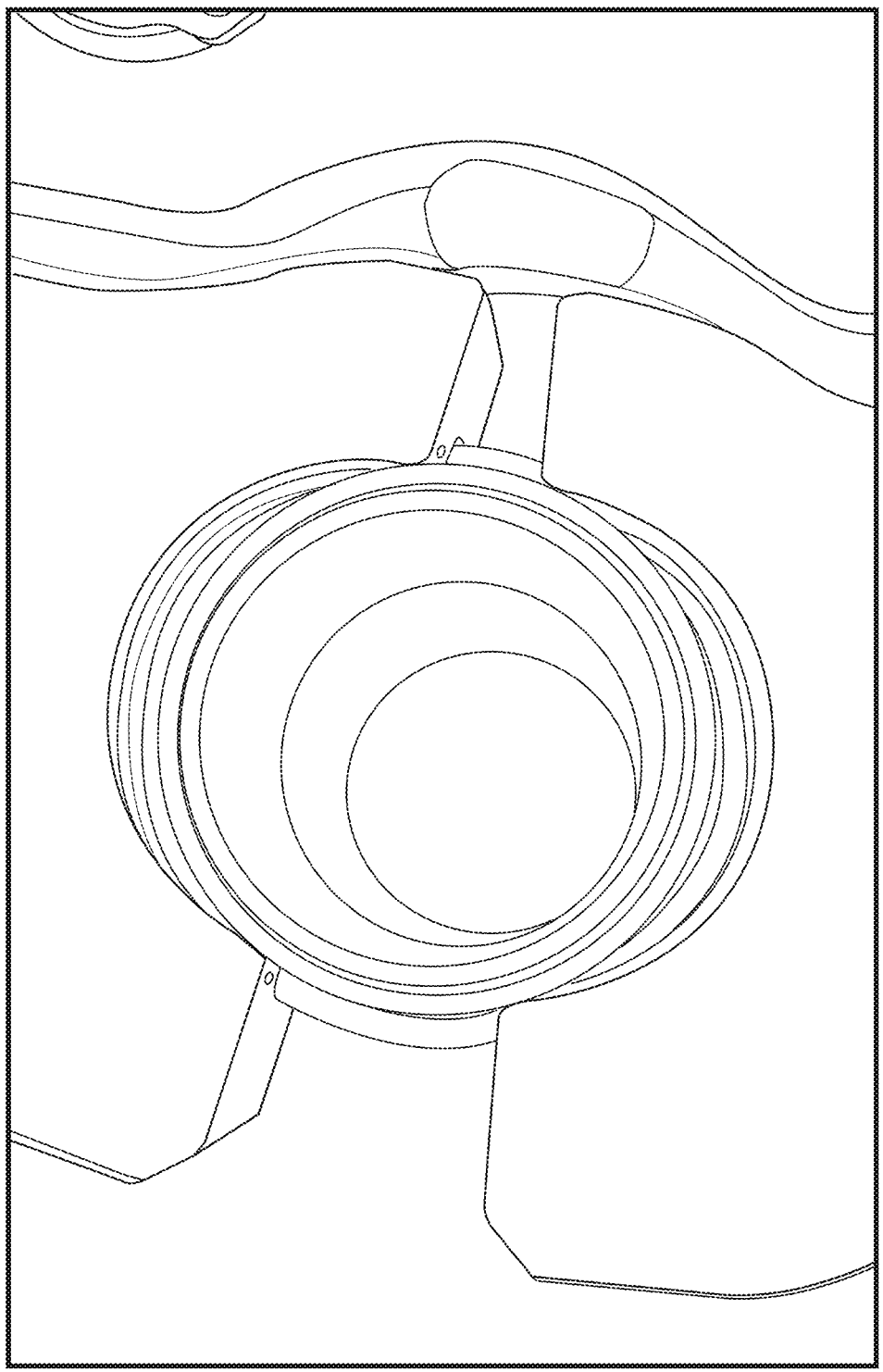
FIG. 13 is photograph of a pressing tool utilized in Comparative Example D disclosed herein.

When the pressing tools were used to press fit the piping components with the corresponding pipes into assemblies, "finning" F occurred on the crimped portions of the first ends of the piping components, as illustrated in FIG. 13.

Example 4

In another example (Ex. 4), a plurality of piping components of varying sizes were pressed with a plurality of pipes of correspondingly varied diameters by pressing tools of corresponding sizes to form assemblies. The plurality of pipes included pipes having diameters of 1.125" and 1.375". Each pipe was formed of annealed ACR tubing. The corresponding piping components were sized to fit with the plurality of pipes and were exemplary of the properties of the piping components of this disclosure. The pressing tools were exemplary of the pressing tools described herein, such that the first end-crimping portions of the first and second pressing jaws included the second sections having a curvature of a radius less than the radius of the first sections, as described herein.

Figure 14:
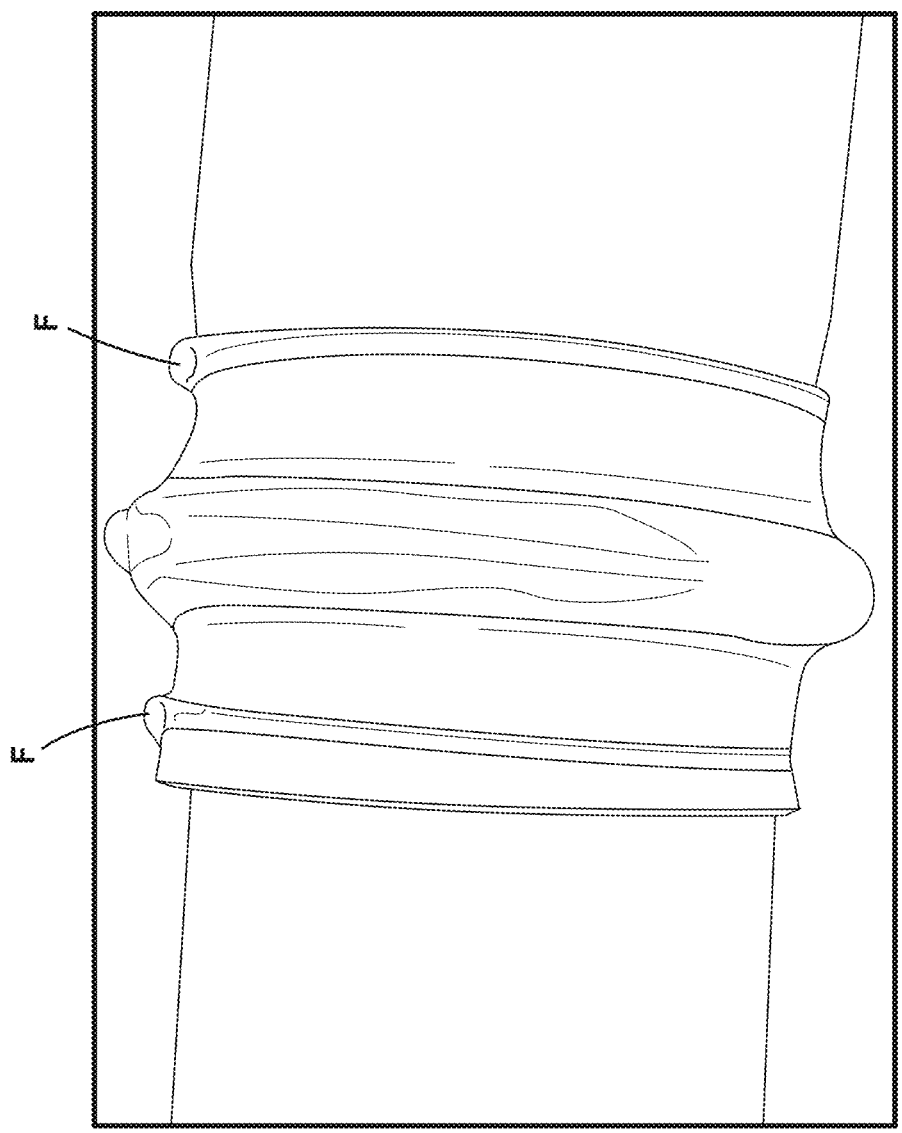
FIG. 14 is a photograph of a piping component press joined with a pipe, illustrating "finning" on the crimped first end of the piping component.
Figure 15:
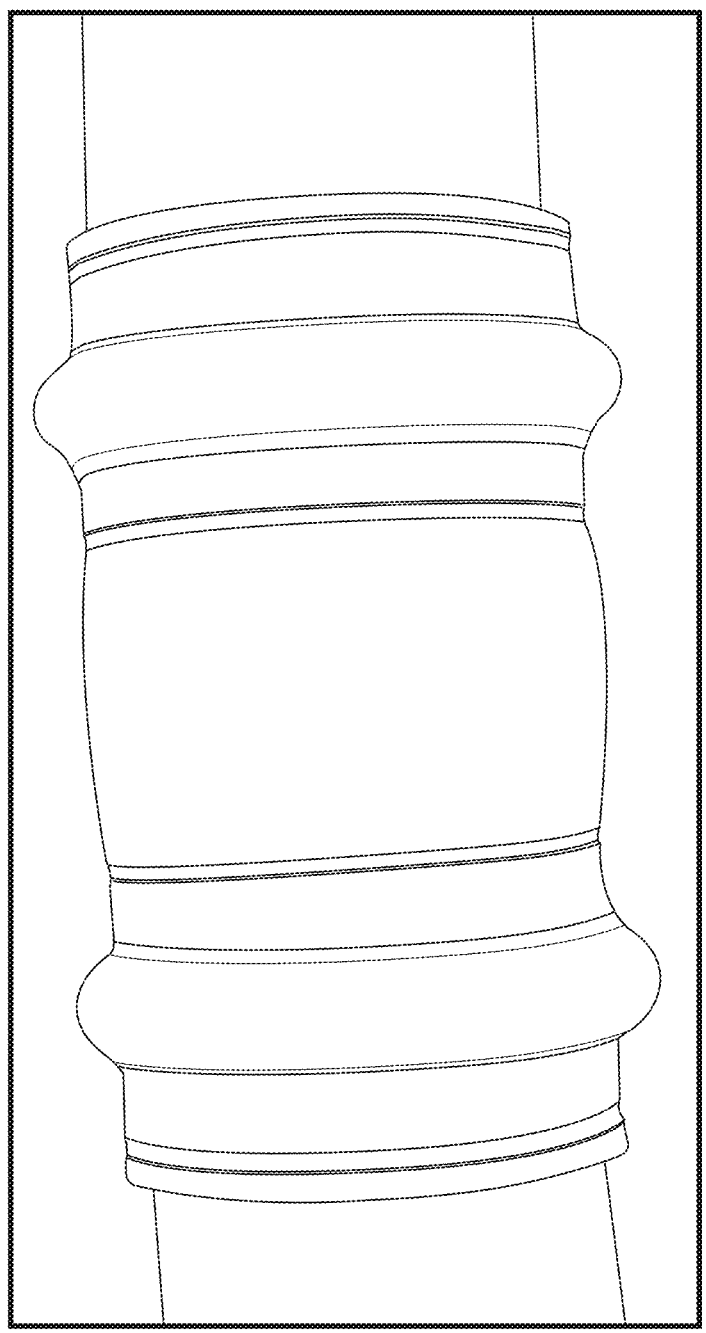
FIG. 15 is a photograph of a piping component press joined with a pipe.

When the pressing tools were used to press fit the piping components with the corresponding pipes into assemblies, little to no finning F occurred on the crimped portions of the first ends of the piping components, as illustrated in FIG. 14. The assembly of Ex. 4 subsequently out-performed the assembly of Ex. D in fatigue tests, wherein the assemblies were cycled between atmospheric pressure and 700 PSI 250,000 times for a minimum of 0.1 seconds per cycle.

According to a first aspect, a pressing tool for press joining a piping component with a pipe includes first and second pressing jaws. The first and second pressing jaws each include a proximal end and a distal end and are operable between an open condition, wherein the distal ends are separated from each other, and a closed condition, wherein the distal ends are in contact with each other. The first pressing jaw includes a first pressing geometry that forms a first end-crimping portion configured to crimp a first end of the piping component. The first end-crimping portion extends generally semi-circumferentially from the distal end of the first pressing jaw to the proximal end of the first pressing jaw. The first end-crimping portion includes a first section positioned between the proximal and distal ends of the first pressing jaw. The first section has a curvature of a first radius. The first end-crimping portion further includes a second section positioned between the first section and the distal end of the first pressing jaw. The second section has a curvature of a second radius that is less than the first radius. The second section is recessed relative to a third section of the first end-crimping portion that is adjacent to the second section and between the distal end of the first pressing jaw and the second section.

According to a second aspect, the first aspect is provided, wherein the first end-crimping portion further comprises a fourth section positioned between the first section and the second section, wherein the fourth section is generally planar.

According to a third aspect, the first aspect is provided, wherein the second section is adjacent to and recessed relative to the first section.

According to a fourth aspect, any one of the first through third aspects is provided, wherein the second radius is about 8.0 millimeters.

According to a fifth aspect, any one of the first through fourth aspects is provided, wherein the second radius is greater than 7.9 millimeters.

According to a sixth aspect, any one of the first through fifth aspects is provided, wherein the pressing jaw further includes a second pressing geometry that forms a sealing recess-pressing portion configured to press a sealing recess wall of the piping component, and wherein the first pressing geometry is spaced apart axially from the second pressing geometry and extends axially from an inner periphery that is a first distance from the second pressing geometry to an outer periphery that is a second distance from the second pressing geometry, wherein the second distance is greater than the first distance.

According to a seventh aspect, the sixth aspect is provided, wherein the first pressing jaw further comprises: a third pressing geometry that forms a body-crimping portion that is spaced apart axially from the first pressing geometry, such that the second pressing geometry is positioned axially between the first and third pressing geometries, wherein the third pressing geometry extends axially from an inner periphery that is a third distance from the second pressing geometry to an outer periphery that is a fourth distance from the second pressing geometry, wherein the fourth distance is greater than the third distance.

According to an eighth aspect, the seventh aspect is provided, wherein a distance that the outer periphery of the first pressing geometry is axially spaced apart from the outer periphery of the third pressing geometry defines a crimp width of the pressing tool, wherein the crimp width of the pressing tool is about equal to and not greater than a Maximum Crimp Width Value of the pressing tool.

According to a ninth aspect, any one of the first through eighth aspects is provided, wherein a distance twice the first radius of the first section defines a crimp diameter of the pressing tool, wherein the crimp diameter is about equal to and not greater than a Maximum Crimp Diameter Value of the pressing tool.

According to a tenth aspect, the first aspect is provided, wherein the sealing recess-pressing portion extends generally semi-circumferentially from the distal end of the first pressing jaw to the proximal end of the first pressing jaw, wherein at least a portion of the sealing recess-pressing portion positioned between the proximal and distal ends of the first pressing jaw has a curvature of a given radius, wherein a distance of twice the given radius of at least the portion of the sealing recess-pressing portion defines a bead diameter of the pressing tool, wherein the bead diameter is about equal to and not greater than a Maximum Bead Diameter Value of the pressing tool.

According to an eleventh aspect of the present disclosure, a pressing tool for press joining a piping component with a pipe includes first and second pressing jaws. The first and second pressing jaws each include a proximal end and a distal and are operable between an open condition, wherein the distal ends are separated from each other, and a closed condition, wherein the distal ends are in contact with each other. The first pressing jaw includes a first pressing geometry that forms a first end-crimping portion configured to crimp a first end of the piping component, a second pressing geometry that forms a sealing recess-pressing portion configured to press a sealing recess wall of the piping component, and a third pressing geometry that forms a body-crimping portion configured to crimp a body of the piping component. The first pressing geometry is spaced apart axially from the second pressing geometry and extends axially from an inner periphery that is a first distance from the second pressing geometry to an outer periphery that is a second distance from the second pressing geometry, wherein the second distance is greater than the first distance. The third pressing geometry is spaced apart axially from the first pressing geometry, such that the second pressing geometry is positioned axially between the first and third pressing geometries. The third pressing geometry extends axially from an inner periphery that is a third distance from the second pressing geometry to an outer periphery that is a fourth distance from the second pressing geometry, wherein the fourth distance is greater than the third distance.

According to a twelfth aspect, the eleventh aspect is provided, wherein a distance that the outer periphery of the first pressing geometry is axially spaced apart from the outer periphery of the third pressing geometry defines a crimp width of the pressing tool, wherein the crimp width of the pressing tool is about equal to and not greater than a Maximum Crimp Width Value of the pressing tool.

According to a thirteenth aspect, any one of the eleventh and twelfth aspects is provided, wherein the first end-crimping portion extends generally semi-circumferentially from the distal end of the first pressing jaw to the proximal end of the first pressing jaw and includes a first section positioned between the proximal and distal ends of the first pressing jaw having a curvature of a first radius and a second section positioned between the first section and the distal end of the first pressing jaw having a curvature of a second radius less than the first radius.

According to a fourteenth aspect, the thirteenth aspect is provided, wherein the second radius is about 8.0 millimeters.

According to a fifteenth aspect, any one of the thirteenth and fourteenth aspects is provided, wherein a distance twice the first radius of the first section defines a crimp diameter of the pressing tool, wherein the crimp diameter is about equal to and not greater than a Maximum Crimp Diameter Value of the pressing tool.

According to a sixteenth aspect, any one of the eleventh through fifteenth aspects is provided, wherein the sealing recess-pressing portion extends generally semi-circumferentially from the distal end of the first pressing jaw to the proximal end of the first pressing jaw, wherein at least a portion of the sealing recess-pressing portion positioned between the proximal and distal ends of the first pressing jaw has a curvature of a given radius, wherein a distance of twice the given radius of at least the portion of the sealing recess-pressing portion defines a bead diameter of the pressing tool, wherein the bead diameter is about equal to and not greater than a Maximum Bead Diameter Value of the pressing tool.

According to a seventeenth aspect of the present disclosure, a method of press joining a piping component with a pipe via a pressing tool includes the steps of: inserting the pipe into the piping component, and pressing the pipe and piping component with the pressing tool, such that a sealing recess-pressing portion of the pressing tool presses a sealing recess wall of the piping component and a first end-crimping portion of the pressing tool crimps an open first end of the piping component between the sealing recess wall and a rim of the first end positioned distally from the sealing recess wall. Further, the pipe and piping component are pressed with the pressing tool, such that the pipe is operable to withstand 2 million vibration cycles at an amplitude of 0.125 inches and a frequency of 16.67 Hertz under a UL 109 vibration test without breakage along the rim of the first end.

According to an eighteenth aspect, the seventeenth aspect is provided, wherein the pressing tool comprises first and second pressing jaws operable between open and closed conditions, wherein the first pressing jaw includes a first pressing geometry that forms the first end-crimping portion and a second pressing geometry that forms the sealing recess-pressing portion, the first pressing geometry is spaced apart axially from the second pressing geometry and extends axially from an inner periphery a first distance from the second pressing geometry to an outer periphery a second distance from the second pressing geometry, and the second distance is greater than the first distance, and wherein, in the step of pressing the pipe and piping component, the outer periphery of the first pressing geometry contacts the first end between the rim and the sealing recess wall, such that the first end is crimped between the rim and the sealing recess wall.

According to a nineteenth aspect, the eighteenth aspect is provided, wherein the first pressing jaw further includes a third pressing geometry that forms a body-crimping portion that is spaced apart axially from the first pressing geometry such that the second pressing geometry is positioned axially between the first and third pressing geometries, wherein the third pressing geometry extends axially away from the second pressing geometry from an inner periphery to an outer periphery.

According to a twentieth aspect, any one of the seventeenth through nineteenth aspects is provided, further comprising the step of rotating a sealing element received with within a sealing recess of the piping component defined by the sealing recess wall, wherein the rotation of the sealing element is prompted by interference between the pipe and at least one protrusion extending from the inner surface of the sealing element as the pipe is inserted into the piping component.

According to a twenty-first aspect, an assembly configured to be press joined with a pipe by a pressing tool includes a piping component, which includes a body, a first end having a rim and an inner surface having a plurality of grooves, and a sealing recess wall positioned between the first end and the body and defining a sealing recess. The assembly also includes a sealing element received within the sealing recess of the piping component and having a sealing element thickness. The sealing element thickness of the sealing element is about equal to and not less than a Minimum Sealing Element Thickness Value of the sealing element.

According to a twenty-second aspect, the twenty-first aspect is provided, wherein the sealing recess wall is configured to be received within a sealing recess-pressing portion of a first pressing jaw of the pressing tool, the body is configured to be crimped by a body-crimping portion of the first pressing jaw, and the first end is configured to be crimped by a first end-crimping portion of the first pressing jaw, wherein the first end-crimping portion is defined by a first pressing geometry that includes an inner periphery and an outer periphery that is further than the inner periphery from the sealing recess-pressing portion, such that, if the sealing recess wall is received within the sealing recess-pressing portion and a crimp width of the pressing tool is about equal to and not greater than a Maximum Crimp Width Value of the pressing tool, the outer periphery of the first pressing geometry is positioned axially between the rim of the first end and the sealing recess wall.

According to a twenty-third aspect, any one of the twenty-first aspect and the twenty-second aspect is provided, wherein the pipe has a pipe diameter of one of about 1.125 inches and about 1.375 inches, and the sealing element thickness of the sealing element is about equal to and not less than 0.120 inches.

According to a twenty-fourth aspect, the twenty-third aspect is provided, wherein the sealing element thickness of the sealing element is between 0.120 inches and 0.130 inches.

According to a twenty-fifth aspect, any one of the twenty-first aspect and the twenty-second aspect is provided, wherein the pipe has a pipe diameter of one of about 0.875 inches and about 0.75 inches, and the sealing element thickness of the sealing element is about equal to and not less than 0.116 inches.

According to a twenty-sixth aspect, any one of the twenty-first aspect and the twenty-second aspect is provided, wherein the pipe has a pipe diameter of about 0.625 inches and the sealing element thickness of the sealing element is about equal to and not less than 0.112 inches.

According to a twenty-seventh aspect, any one of the twenty-first aspect and the twenty-second aspect is provided, wherein the pipe has a pipe diameter of one of about 0.5 inches and about 0.375 inches, and the sealing element thickness of the sealing element is about equal to and not less than 0.070 inches.

According to a twenty-eighth aspect, any one of the twenty-first aspect and the twenty-second aspect is provided, wherein the pipe has a pipe diameter of about 0.3125 inches and the sealing element thickness of the sealing element is about equal to and not less than 0.065 inches.

According to a twenty-ninth aspect, the any one of twenty-first aspect and the twenty-second aspect is provided, wherein the pipe has a pipe diameter of about 0.25 inches and the sealing element thickness of the sealing element is about equal to and not less than 0.063 inches.

According to a thirtieth aspect, an assembly configured to be press joined with a pipe by a pressing tool includes a piping component, which includes a body, a first end having a rim, and a sealing recess wall positioned between the first end and the body and defining a sealing recess. The assembly also includes a sealing element received within the sealing recess of the piping component. A sealing element thickness of the sealing element is about equal to and not less than a Minimum Sealing Element Thickness Value of the sealing element. The pressing tool includes first and second pressing jaws each having a proximal end and a distal end and being operable between an open condition and a closed condition. In the open condition, the distal ends are separated from each other. In the closed condition, the distal ends are in contact with each other. The first pressing jaw includes a first pressing geometry that forms a first end-crimping portion configured to crimp a first end of the piping component, a second pressing geometry that forms a sealing recess-pressing portion configured to receive and press a sealing recess wall of the piping component, and a third pressing geometry that forms a body-crimping portion configured to crimp a body of the piping component. The first pressing geometry is spaced apart axially from the second pressing geometry and extends axially from an inner periphery that is a first distance from the second pressing geometry to an outer periphery that is a second distance from the second pressing geometry. The second distance is greater than the first distance. Further, the third pressing geometry is spaced apart axially from the first pressing geometry, such that the second pressing geometry is positioned axially between the first and third pressing geometries, and the third pressing geometry extends axially from an inner periphery that is a third distance from the second pressing geometry to an outer periphery that is a fourth distance from the second pressing geometry. The fourth distance is greater than the third distance. If the sealing recess wall is received within the sealing recess-pressing portion and a crimp width of the pressing tool is about equal to and not greater than a Maximum Crimp Width Value of the pressing tool, the outer periphery of the first pressing geometry is positioned axially between the rim of the first end and the sealing recess wall.

According to a thirty-first aspect, the thirtieth aspect is provided, wherein the pipe has a pipe diameter of one of about 1.125 inches and about 1.375 inches, and the sealing element thickness of the sealing element is about equal to and not less than 0.120 inches.

According to a thirty-second aspect, the thirtieth aspect is provided, wherein the pipe has a pipe diameter of one of about 0.875 inches and about 0.75 inches, and the sealing element thickness of the sealing element is about equal to and not less than 0.116 inches.

According to a thirty-third aspect, the thirtieth aspect is provided, wherein the pipe has a pipe diameter of about 0.625 inches and the sealing element thickness of the sealing element is about equal to and not less than 0.112 inches.

According to a thirty-fourth aspect, the thirtieth aspect is provided, wherein the pipe has a pipe diameter of one of about 0.5 inches and about 0.375 inches, and the sealing element thickness of the sealing element is about equal to and not less than 0.070 inches.

According to a thirty-fifth aspect, the thirtieth aspect is provided, wherein the pipe has a pipe diameter of about 0.3125 inches and the sealing element thickness of the sealing element is about equal to and not less than 0.065 inches.

According to a thirty-sixth aspect, the thirtieth aspect is provided, wherein the pipe has a pipe diameter of about 0.25 inches and the sealing element thickness of the sealing element is about equal to and not less than 0.063 inches.

According to a thirty-seventh aspect, a method of press joining a piping component with a pipe via a pressing tool includes the step of inserting the pipe into the piping component. The piping component has a sealing element received within a sealing recess defined by a sealing recess wall of the piping component. The sealing element has a sealing element thickness and the sealing element thickness of the sealing element is about equal to and not less than a Minimum Sealing Element Thickness Value of the sealing element. The method further includes the step of pressing the pipe and piping component with the pressing tool, such that a sealing recess-pressing portion of the pressing tool presses the sealing recess wall of the piping component and a first end-crimping portion of the pressing tool crimps a first end of the piping component between the sealing recess wall and a rim of the first end positioned distally from the sealing recess wall, and such that the pipe is operable to withstand 2 million vibration cycles at an amplitude of 0.125 inches and a frequency of 16.67 Hertz under a UL 109 vibration test without breakage along the rim of the first end.

According to a thirty-eighth aspect, the thirty-seventh aspect is provided, comprising the step of rotating the sealing element received within the sealing recess of the piping component, wherein the rotation of the sealing element is prompted by interference between the pipe and at least one protrusion extending from an inner surface of the sealing element as the pipe is inserted into the piping component.

According to a thirty-ninth aspect, the thirty-seventh aspect is provided, wherein the pressing tool includes first and second pressing jaws operable between open and closed conditions, wherein the first pressing jaw includes a first pressing geometry that forms the first end-crimping portion and a second pressing geometry that forms the sealing recess-pressing portion, the first pressing geometry is spaced apart axially from the second pressing geometry and extends axially from an inner periphery a first distance from the second pressing geometry to an outer periphery a second distance from the second pressing geometry, and the second distance is greater than the first distance, and wherein, in the step of pressing the pipe and piping component, the outer periphery of the first pressing geometry contacts the first end between the rim and the sealing recess wall, such that the first end is crimped between the rim and the sealing recess wall.

According to a fortieth aspect, the thirty-ninth aspect is provided, wherein the first pressing jaw further includes a third pressing geometry that forms a body-crimping portion that is spaced apart axially from the first pressing geometry such that the second pressing geometry is positioned axially between the first and third pressing geometries, wherein the third pressing geometry extends axially away from the second pressing geometry from an inner periphery to an outer periphery.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:
1. An assembly, comprising:
a piping component, comprising:
  a body;
  a first end having a rim and an inner surface having a plurality of grooves; and
  a sealing recess wall positioned between the first end and the body and defining a sealing recess, wherein the piping component is sized to be press fit with a pipe having a pipe diameter equal to of one of 0.25 inches, 0.3125 inches, 0.375 inches, 0.5 inches, 0.625 inches, 0.75 inches, 0.875 inches, 1.125 inches, and 1.375 inches; and
a sealing element received within the sealing recess of the piping component and having a sealing element thickness, wherein the sealing element thickness of the sealing element is equal to and not less than an amount within a range of from 0.063 inches to 0.063 inches plus tolerances if the piping component is sized to be press fit with the pipe having the pipe diameter equal to 0.25 inches,
the sealing element thickness of the sealing element is equal to and not less than an amount within a range of from 0.065 inches to 0.065 inches plus tolerances if the piping component is sized to be press fit with the pipe having the pipe diameter equal to 0.3125 inches,
the sealing element thickness of the sealing element is equal to and not less than an amount within a range of from 0.070 inches to 0.070 inches plus tolerances if the piping component is sized to be press fit with the pipe having the pipe diameter equal to 0.375 inches,
the sealing element thickness of the sealing element is equal to and not less than an amount within a range of from 0.070 inches to 0.070 inches plus tolerances if the piping component is sized to be press fit with the pipe having the pipe diameter equal to 0.5 inches,
the sealing element thickness of the sealing element is equal to and not less than an amount within a range of from 0.112 inches to 0.112 inches plus tolerances if the piping component is sized to be press fit with the pipe having the pipe diameter equal to 0.625 inches,
the sealing element thickness of the sealing element is equal to and not less than an amount within a range of from 0.116 inches to 0.116 inches plus tolerances if the piping component is sized to be press fit with the pipe having the pipe diameter equal to 0.75 inches,
the sealing element thickness of the sealing element is equal to and not less than an amount within a range of from 0.116 inches to 0.116 inches plus tolerances if the piping component is sized to be press fit with the pipe having the pipe diameter equal to 0.875 inches,
the sealing element thickness of the sealing element is equal to and not less than an amount within a range of from 0.120 inches to 0.120 inches plus tolerances if the piping component is sized to be press fit with the pipe having the pipe diameter equal to 1.125 inches, and
the sealing element thickness of the sealing element is equal to and not less than an amount within a range of from 0.120 inches to 0.120 inches plus tolerances if the piping component is sized to be press fit with the pipe having the pipe diameter equal to 1.375 inches.

2. The assembly of claim 1, wherein the piping component is sized to be press fit with the pipe that has the pipe diameter of one of 1.125 inches and 1.375 inches, and the sealing element thickness of the sealing element is equal to and not less than an amount within a range from 0.120 inches to 0.120 inches plus tolerances.

3. The assembly of claim 1, wherein the piping component is sized to be press fit with the pipe that has the pipe diameter of one of 0.875 inches and 0.75 inches, and the sealing element thickness of the sealing element is equal to and not less than an amount within a range of from 0.116 inches to 0.116 inches plus tolerances.

4. The assembly of claim 1, wherein the piping component is sized to be press fit with the pipe that has the pipe diameter of 0.3125 inches, and the sealing element thickness of the sealing element is equal to and not less than an amount within a range of from 0.065 inches to 0.065 inches plus tolerances.

5. The assembly of claim 1, wherein the piping component is sized to be press fit with the pipe that has the pipe diameter of one of 0.5 inches and 0.375 inches, and the sealing element thickness of the sealing element is equal to and not less than an amount within a range of from 0.070 inches to 0.070 inches plus tolerances.

6. The assembly of claim 1, wherein the piping component is sized to be press fit with the pipe that has the pipe diameter of 0.3125 inches, and the sealing element thickness of the sealing element is equal to and not less than an amount within a range of from 0.065 inches to 0.065 inches plus tolerances.

7. The assembly of claim 1, wherein the piping component is sized to be press fit with the pipe that has the pipe diameter of 0.25 inches, and the sealing element thickness of the sealing element is equal to and not less than an amount within a range of from 0.063 inches to 0.063 inches plus tolerances.

* * * * *

UNITED STATES PATENT AND TRADEMARK OFFICE
CERTIFICATE OF CORRECTION

Page 1 of 1

PATENT NO. : 12,060,954 B2
APPLICATION NO. : 17/245692
DATED : August 13, 2024
INVENTOR(S) : Stogdill It is certified that error appears in the above-identified patent and that said Letters Patent is hereby corrected as shown below:

In the Specification

Column 20, Line 32, "We" should be --Wc--;

Column 21, Line 19, "We" should be --Wc--;

Column 21, Line 37, "We" should be --Wc--;

Column 22, Line 43, "We" should be --Wc--; and

In the Claims

Column 32, Claim 1, Line 16, "of one of" should be --one of--.

Signed and Sealed this
Twenty-first Day of October, 2025

John A. Squires
*Director of the United States Patent and Trademark Office*